US012640986B1

(12) United States Patent
Wang et al.

(10) Patent No.: US 12,640,986 B1
(45) Date of Patent: May 26, 2026

(54) METHOD FOR SFC DEPLOYMENT AND MIGRATION BASED ON VNF-DEPENDENT COMPONENTS

(71) Applicant: Nanjing University of Aeronautics and Astronautics, Jiangsu (CN)

(72) Inventors: Ran Wang, Jiangsu (CN); Yuhan Zhang, Jiangsu (CN); Qiang Wu, Jiangsu (CN); Jie Hao, Jiangsu (CN)

(73) Assignee: Nanjing University of Aeronautics and Astronauitcs, Jiangsu (CN)

( * ) Notice: Subject to any disclaimer, the term of this patent is extended or adjusted under 35 U.S.C. 154(b) by 0 days.

(21) Appl. No.: 19/224,900

(22) Filed: Jun. 2, 2025

(30) Foreign Application Priority Data

Jan. 16, 2025 (CN) .......................... 202510067668.6

(51) Int. Cl.
| | |
|---|---|
| *G06F 15/173* | (2006.01) |
| *H04L 41/0897* | (2022.01) |
| *H04L 41/122* | (2022.01) |
| *H04L 41/16* | (2022.01) |
| *H04L 41/40* | (2022.01) |
| *H04W 16/18* | (2009.01) |

(52) U.S. Cl.
CPC ........ *H04L 41/122* (2022.05); *H04L 41/0897* (2022.05); *H04L 41/16* (2013.01); *H04L 41/40* (2022.05); *H04W 16/18* (2013.01)

(58) Field of Classification Search
CPC ... H04L 41/122; H04L 41/0897; H04L 41/16; H04L 41/40; H04W 16/18
See application file for complete search history.

(56) References Cited

U.S. PATENT DOCUMENTS

| | | | | |
|---|---|---|---|---|
| 10,432,552 B2 * | 10/2019 | Zhang | ................... | G06F 9/5038 |
| 12,495,009 B2 * | 12/2025 | Kim | ...................... | H04L 47/781 |
| 2019/0190813 A1 * | 6/2019 | Xu | .......................... | H04L 45/64 |

* cited by examiner

*Primary Examiner* — John B Walsh

(74) *Attorney, Agent, or Firm* — JC ONE WORLD

(57) ABSTRACT

Disclosed is a method for SFC deployment and migration based on VNF-dependent components, which pertains to the field of communication technologies. The method jointly optimizes SFC deployment and migration policies with consideration of VNF-dependent component migration, and is used for addressing mobile user service provisioning issues. The method is based on a mobile terminal user initiating a service request information to an SDN controller, which analyzes, based on the service request information, user demand types and resource requirements thereof, including bandwidth resources, computing resources, storage resources, delay requirements, and the like, and the SDN controller, in combination with a network topology structure, resource status of an edge server, and network operation conditions, optimizes the deployment and migration of the SFCs using deep reinforcement learning technology. In the present disclosure, the interactions among VNF-dependent component migration, SFC deployment, and SFC migration decisions are comprehensively considered to efficiently provide mobile services.

5 Claims, 18 Drawing Sheets

METHOD FOR SFC DEPLOYMENT AND MIGRATION BASED ON VNF-DEPENDENT COMPONENTS

CROSS-REFERENCE TO RELATED APPLICATION

This application claims the priority benefit of China application serial no. 202510067668.6, filed on Jan. 16, 2025. The entirety of the above-mentioned patent application is hereby incorporated by reference herein and made a part of this specification.

TECHNICAL FIELD

The present disclosure relates to the technical field of advanced network and communication technologies, and in particular, to a method for SFC deployment and migration based on VNF-dependent components.

RELATED ART

With the proliferation of mobile devices and applications, the issue of mobile service provisioning has attracted considerable attention from both academia and industry. The delivery of mobile services involves not only addressing service offloading issues but also service migration to maintain the quality of service (QoS). Certain studies have proposed service migration policies to alleviate server failures, mitigate overload conditions, or achieve cost-effectiveness, aiming to maintain optimal service delivery performance. However, these methods are unsuitable for mobile service delivery scenarios. Addressing migration issues arising from user mobility is critical to ensuring continuous service delivery and optimizing overall performance.

While some studies have considered migration issues caused by user mobility, they have not taken into account the significant impact of service state migration caused by user mobility on performance. Subsequently, some studies have incorporated service state migration to mitigate the impact of user mobility. Researchers have extensively explored complexities in SFC deployment and migration, including SFC deployment and migration under random user mobility, and SFC deployment and migration assuming known user mobility trajectories. Nevertheless, accurately predicting trajectories of mobile users remains a major challenge in most cases.

Although previous studies have contributed effective solutions for mobile service in various environments such as MEC and cloud-fog computing while taking into account user mobility, the policies are not readily applicable to new scenarios involving SFC deployment and migration with VNF-dependent component migration. Zhang et al. addressed the issue of VNF-dependent component migration during SFC deployment; however, their work focused on static SFC deployment. When user mobility is considered, it is necessary to migrate the SFCs themselves as well. The present disclosure provides an innovative method for the online deployment of mobility-aware SFCs in a dense MEC network integrated with a 3GPP cellular networks, and further provides a control policy for SFC migration to redeploy these chains while taking into account VNF-dependent component migration.

SUMMARY OF INVENTION

Objectives of the present disclosure are: to optimize end-to-end communication delay and resource utilization costs for mobile users, reduce interruption delay, improve service acceptance rate, and efficiently manage limited resources while delivering high-quality mobile services. The present disclosure provides a method for SFC deployment and migration based on VNF-dependent components.

The technical solutions are as follows: Provided is a method for service function chain (SFC) deployment and migration based on virtualized network function (VNF)-dependent components, where the method is based on a mobile terminal user initiating a service request information to a software-defined networking (SDN) controller, the SDN controller analyzes, based on the service request information, user demand types and resource requirements thereof, including bandwidth resources, computing resources, storage resources, delay requirements, and the like, and the SDN controller, in combination with a network topology structure, resource status of an edge server, and network operation conditions, optimizes the deployment and migration of the SFCs using deep reinforcement learning technology, the method including the following steps:

(1) constructing a communication architecture including a mobile user, an edge server, and an SDN controller, where in the communication architecture, the mobile user is configured to generate a dynamic service demand, including a computing task, a data storage service, and a communication service, the edge server is deployed at locations close to the mobile user and configured to provide computing and communication services for the mobile user, and the SDN controller is configured to monitor in real time the service demands of the mobile user and the resource status of the edge server, and dynamically adjust resource allocation and scheduling policies based on network topology information;

(2) constructing a user request model, a communication model, and a computing model for describing operation mechanisms and performance metrics of a system, where the user request model includes a deployment request and a migration request of the SFCs, the deployment request describes user demands for bandwidth resources, computing resources, memory resources, and storage resources, and the migration request is used for transferring the currently deployed SFCs to a target edge server when the mobile user moves;

the communication model defines a bandwidth allocation policy of the edge server, and computes transmission rate and data transmission time based on Shannon Formula and channel interference metrics, thereby achieving appropriate allocation of communication resources;

the computing model includes processing and computing end-to-end communication delay, resource usage cost, and interruption delay during SFC migration for use in evaluating service performance and providing theoretical support for resource optimization and scheduling in the system;

(3) formulating a resource scheduling optimization problem and defining an optimization objective based on the network topology information, the user request model, the communication model, and the computing model of the communication system, where the optimization problem includes maximizing service access rate ofuser requests, minimizing end-to-end communication delay and SFC migration delay, and maximizing resource utilization rate; during an SFC migration process, VNF migration paths and resource usage costs of dependent components are optimized to reduce service interruption time caused by the migration; and (4) performing deep reinforcement learning-based SFC deployment and migration with consideration of VNF-dependent components, where the SDN controller collects in real time the user requests, the resource status of the edge server, and the network topology information, and a deep reinforcement learning algorithm is used to dynamically make decisions on the following content:

a user access policy: intelligently selecting an optimal edge server for access based on a geographic location and a service demand of the mobile user;

an SFC deployment and migration policy: dynamically adjusting deployment and migration paths of the SFCs by comprehensively considering the resource utilization rate, the communication delay, and migration delay; and a VNF-dependent component migration policy: prioritizing migration of key VNF components based on dependency relationships of the VNFs in the SFCs to ensure integrity and continuity of a service chain.

Further, the user request model, the communication model, and the computing model according to Step (2) are as follows:

(21) user request model, where the user request r is denoted as $$SFCr, \Gamma_r = \left(b_r, \overline{d}r, TTL_r, G_r, \tau_r^s\right)$$

is a 5-tuple of SFCr, where $b_r$ is defined as a bandwidth requirement, $\overline{d}r$ denotes a communication delay requirement, and $TTL_r$ denotes a lifetime of SFCr; the SFC is described as a directed graph $G_r=(F_r, E_r)$, where $F_r=\{f_{r1}, f_{r2}, \ldots, f_{rh}, \ldots, f_{r|F_r|}\}$ denotes a set of VNFs in SFCr, any one VNF $f_{rh}$ requires a CPU resource $$R^c_{f_{rh}}$$

and a memory resource $$R^m_{f_{rh}},$$

and $E_r$ denotes a virtual link of SFCr; an arrival time of SFCr is denoted as $$\tau_r^s = m \cdot \triangle,$$

where m denotes the number of time slots, and $\triangle$ denotes duration of each time slot;

for SFC deployment, a decision variable $$a_r^{n_i}(t)$$

is used to indicate whether to access a network through an edge server node $$n_i, x_{f_{rh}}^{n_i}(t)$$

is used to indicate whether to place a VNF $f_{rh}$ on the edge server node $n_i$, and $$y_{\xi_{frg},f_{rh}}^{e_{ij}}(t)$$

is a binary variable used to indicate whether a logical link $\xi_{f_{rg},f_{rh}}$ is mapped to a link $e_{ij}$, mathematically expressed as:

$$a_r^{n_i}(t) = \begin{cases} 1, & \text{if } r \text{ accesses network via } n_1, \\ 0, & \text{otherwise} \end{cases}$$

$$x_{f_{rh}}^{n_i}(t) = \begin{cases} 1, & \text{if } f_{rh} \text{ is placed on } n_i \\ 0, & \text{otherwise} \end{cases}$$

$$y_{\xi_{frg},f_{rg}}^{e_{ij}}(t) = \begin{cases} 1, & \text{if } \xi_{f_{rg},f_{rh}} \text{ is mapped on } e_{ij} \\ 0, & \text{otherwise} \end{cases}$$

for SFC migration, when a VNF is deployed on the edge server node $n_i$ or migrated to the edge server node $n_i$, if component resources required for supporting operation of the VNF are unavailable at the edge server node $n_i$, the VNF-dependent components must be migrated from other nodes to the edge server node $n_i$ to ensure normal operation of the VNF;

(22) communication model, where the bandwidth resources of the edge server node $n_i$ are uniformly allocated to SFCr to ensure fair allocation, mathematically expressed as:

$$w_{n_i}^r = \phi_{n_i}^b \cdot \frac{a_r^{n_i}}{\sum_{r_j \in N_{n_i}} a_{r_j}^{n_i}},$$

where $N_{n_i}$ denotes a set of SFCs accessing the edge server node $$n_i, \phi_{n_i}^b$$

denotes the bandwidth resources on the edge server node $n_i$, and $$a_{r_i}^{n_i}$$

represents whether SFC $r_i$ accesses the network via the edge server node $n_i$, with a value of 1 indicating access to the network via the edge server node $n_i$, and 0 otherwise;

a parameter $$r_{n_i}^r$$

is used to represent channel interference experienced by SFCr when accessing the edge server node $n_i$, the interference is generated due to channel contention caused by other SFCs simultaneously accessing the same node, $p_{r_i}$ denotes a transmission capability of SFC$r_i$, and $$H_{n_i}^{r_j}$$

denotes a channel gain influenced by a distance between SFC$r_j$ and the edge server node $n_i$ and a power gain caused by a small-scale fading effect in a channel, mathematically expressed as:

$$\gamma_{n_i}^r = \sum_{r_j \in N_{n_i} \setminus \{r\}} p_{r_j} \cdot H_{n_i}^{r_j}.$$

On this basis, \in the formula represents the influence in addition to SFCr, and a transmission rate between SFCr and the edge server node $n_i$ is obtained by using the following formula:

$$\text{rate}_{n_i}^r = w_{n_i}^r \cdot \log_2\left(1 + \frac{p_r \cdot H_{n_i}^r}{\gamma_{n_i}^r + \rho^2}\right),$$

where $\rho^2$ denotes a signal-to-noise ratio, and data transmission delay $$d_r^{trans}$$

refers to time required for transmitting to-be-transmitted data of SFCr to the edge server node $n_i$, $$d_r^{trans} = \frac{ds_r}{\text{rate}_{n_i}^r};$$

(23) computing model,
where end-to-end communication delay $D_r$ of SFCr is defined as a sum of data transmission delay, VNF processing delay, and link propagation delay, as shown below:

$$D_r = d_r^{trans} + \sum_{f_{rh} \in F_r} x_{f_{rh}}^{n_i} \cdot d_{n_i} + \sum_{\xi_{f_{rg}, f_{rh}} \in E_r} y_{\xi_{f_{rg}, f_{rh}}}^{e_{ij}} \cdot d_{e_{ij}}.$$

deployment costs of the SFCs are defined as follows:

$$C_r^d = \sum_{f_{rh} \in M_r} \sum_{\psi_q \in \Psi_{f_{rh}}^{mig}} \sum_{p_{ij} \in L_{\psi_q}} y_{p_{ij}}^{e_{ij}} + \sum_{f_{rh} \in M_r} \sum_{\psi_q \in \Psi_{f_{rh}}^{mig}} x_{f_{rn}}^{n_t} \cdot c_{n_i}^{sto} \cdot R_{\psi_q}^s;$$

where $L_{\psi_q}$ is a path used by a migration component $$\psi_a, y_{p_{ij}}^{e_{ij}}$$

is a binary variable indicating whether $p_{e_{ij}}$ on the path $L_{\psi_q}$ is mapped to a link $e_{ij}$, and $$c_{n_i}^{sto}$$

denotes unit storage costs of the edge server node $n_i$.

Further, the method minimizes interruption time and enhances success rates through pre-copy migration, the interruption time is defined as duration of a final phase in a migration process, during which services are temporarily interrupted to complete final data synchronization, $$d_{f_{rh}}^{mig,s}$$

is used to denote start time of an interruption period, $$d_{f_{rh}}^{mig,e}$$

denotes end time of the interruption period, and expressions of the two are as follows:

$$d_{f_{rh}}^{mig,s} = \sum_{q=1}^{\theta_{f_{rh}}} d_{f_{rh}}^q = \frac{M_{f_{rh}}^m}{b_{f_{rh}}} \cdot \frac{1 - \left(\frac{dir_{f_{rh}} \cdot M_{f_{rh}}^m}{b_{f_{rh}}}\right)^{\theta_{f_{rh}}}}{1 - \frac{dir_{f_{rh}} \cdot M_{f_{rh}}^m}{b_{f_{rh}}}},$$

$$d_{f_{rh}}^{mig,e} = \sum_{q=1}^{\theta_{f_{rh}}+1} d_{f_{rh}}^q = \frac{M_{f_{rh}}^m}{b_{f_{rh}}} \cdot \frac{1 - \left(\frac{dir_{f_{rh}} \cdot M_{f_{rh}}^m}{b_{f_{rh}}}\right)^{\theta_{f_{rh}}+1}}{1 - \frac{dir_{f_{rh}} \cdot M_{f_{rh}}^m}{b_{f_{rh}}}},$$

where $$d_{f_{rh}}^q$$

denotes migration time of a q-th iteration, $\theta_{f_{rh}}$ denotes actual number of iterations, $$M_{f_{rh}}^m$$

denotes a memory page size of VNF $f_{rh}$ to be migrated, $b_{f_{rh}}$ by denotes a migration rate of VNF $f_{rh}$, and therefore, the interruption time is defined as follows:

$$d_r^{inter} = \max\{d_{f_{rh}}^{mig,e}\} - \min\{d_{f_{rh}}^{mig,s}\}, f_{rh} \in M_r$$

where $M_r$ in the formula denotes a set of VNFs that require migration in SFCr.

Further, the optimization problem and the optimization objective according to Step (3) are as follows:

Constraint 1: each VNF $f_{rh}$ can only be successfully deployed on at most one server node, and VNF instances are indivisible, expressed as:

$$\sum_{n_i \in N} x_{f_{rh}}^{n_i} \le 1, \forall r \in \Gamma_d \bigcup \Gamma_m, \forall f_{rh} \in F_r.$$

Constraint 2: communication quality among users connected to the network through the same node is mutually affected, and each physical node can accommodate at most $n_{max}$ users to maintain service quality for all users, mathematically expressed as:

$$\sum_{r \in \Gamma_d \bigcup \Gamma_m} a_r^{n_i} \le n_m, \forall n_i \in N.$$

Constraint 3: on any server node $n_i$, total CPU and memory resource requirements for SFC deployment and migration shall not exceed a maximum CPU and memory resource capacity, mathematically expressed as:

$$\sum_{r \in \Gamma_d \bigcup \Gamma_m} \sum_{f_{rh} \in F_r} x_{f_{rh}}^{n_i} \cdot R_{f_{rh}}^c \le \phi_{n_i}^c, \forall n_i \in N,$$

$$\sum_{r \in \Gamma_d \bigcup \Gamma_m} \sum_{f_{rh} \in F_r} x_{f_{rh}}^{n_i} \cdot R_{f_{rh}}^m \le \phi_{n_i}^m, \forall n_i \in N.$$

Constraint 4: used storage resources shall not exceed a maximum storage resource capacity, mathematically expressed as:

$$\sum_{\psi_q \in \Psi_{n_i}} z_{\psi_q}^{n_i} \cdot R_{\psi_q}^s \le \phi_{n_i}^s, \forall n_i \in N,$$

where $\Psi_{n_i}$ denotes a set of components on node $n_i$;

Constraint 5: total bandwidth consumption on any link $e_{ij}$ must be less than a maximum bandwidth capacity, the condition being expressed as follows:

$$\sum_{r \in \Gamma_d \bigcup \Gamma_m} \sum_{\xi_{frg}, f_{rh} \in E_r} y_{\xi_{frg}, f_{rh}}^{e_{ij}} \cdot b_r \sum_{r \in \Gamma_m} \sum_{f_{rh} \in M_r} \sum_{p_{ij} \in L_{f_{rh}}} y_{p_{ij}}^{e_{ij}} \cdot b_{f_{rh}} \le b_{e_{ij}}, \forall e_{ij} \in E,$$

where the first term represents a link bandwidth occupied by SFC deployment, and the second term represents a bandwidth used for SFC migration;

Constraint 6: end-to-end delay of any $SFC^r$ must satisfy the following constraint:

$$D_r \le \bar{d}_r, \forall r \in \Gamma_d \bigcup \Gamma_m. \tag{20}$$

where a JSDM-VDSM problem is defined based on the aforementioned constraints, the JSDM-VDSM problem includes an SFC deployment policy, an SFC migration policy, and a VNF-dependent component migration policy Z, and an objective of the method is to maximize QoS by improving service acceptance rate, reducing resource usage cost, and minimizing communication delay and interruption delay, the optimization objective being mathematically defined as follows:

$$\max_{X,Y,A,Z} \qquad P1$$

$$\frac{1}{T} \sum_{t=1}^{T} \sum_{r \in \Gamma_d \bigcup \Gamma_m} Z_r(t) \cdot [w_1 \cdot b_r - w_2 \cdot C_r^d(t) - w_3 \cdot D_r(t) - w_4 \cdot d_{rr}^{inter}(t)],$$

where $Z_r$ (t) is a decision variable used to determine whether the SFC r is accepted, and if the SFCr is accepted, $Z_r(t)$ is set to 1 and otherwise set to 0, and $w_1$, $w_2$, $w_3$, and $w_4$ in the formula denote weights of different metrics.

Further, Step (4) further includes:

identifying, within a network architecture, SFCs that require orchestration, including SFCs requiring deployment and SFCs scheduled for migration, and treating the SFC migration as joint optimization of VNF redeployment and SFC rerouting;

acquiring status of an environment and current SFCs to be orchestrated, where the status includes available CPU, memory, storage, bandwidth, and component resources of physical nodes; CPU, memory, and component resource requirements of VNFs to be deployed; the number of VNFs not yet placed in the deployed SFCs; the partial communication delay of the current SFCs, and the lifetime of the SFCs;

inputting the acquired status $s_i$ into a network Actor$_{old}$ to obtain a VNF deployment decision $a_i$, and then performing iterative interaction with the environment to collect a set of experimental data $[s_i, a_i, r_i, s_{i+1}]$ and storing the same in a memory;

computing an advantage function $A_{\theta_{old}}$ based on the experimental data for use in updating a Critic network; updating a Actor network using a clipped objective function $J_{\theta_{old}}(\theta)$, where after multiple iterations, parameters of the Actor network are transferred to the network Actor$_{old}$, and the iteration process continues until convergence is achieved.

A process of solving the JSDM-VDSM problem includes obtaining the SFC, determining a user access node A, and SFC deployment or migration policies X and Y; determining a VNF-dependent component migration policy Z based on the policies X and Y; prior to learning service provisioning policies, the SDN controller collects global information and releases an SFC whose lifetime has expired, and then identifies the SFCs that require deployment or migration;

requested SFCs for deployment are SFC requests that randomly arrive within a current time slot t, and requested SFCs for migration are SFC requests that meet a migration criterion within the same time slot; if no requests require processing, the SDN controller proceeds to a next time slot to continue to acquire requests until $r_{batch}$ is non-empty; subsequently, the SFC requests in $r_{batch}$ are deployed or migrated sequentially;

for the deployment and migration requests, user regions related to the SFC requests are first determined, and then the SDN controller evaluates whether a base station in the current region has sufficient capacity; if the base station has sufficient capacity, access is performed through the base station; if the base station does not have sufficient capacity, the SDN controller plans connection via adjacent regions, firstly identifying adjacent regions, then computing access capacities of these regions; subsequently, the number of accessible nodes with maximum access capacity is determined, and a region capable of accommodating the maximum capacity is selected; further, one access node is selected from the accessible nodes max_num_node with probability 1−∈, and one access node is selected from a set of the accessible nodes n_max_n_node with probability ∈;

after an access point is selected, the deployment or migration policies of the SFCs and the VNF-dependent component migration policy are determined; a first VNF of SFCr is identified first, then current status is acquired, and a placement position of a VNF $f_{r_h}$ is determined based on a policy $\pi_{\theta old}$ $(a_i, s_i)$; if the VNF $f_{r_h}$ can be placed on a node $a_i$, but component resources required for operation of the VNF $f_{r_h}$ are not currently available on the node $a_i$, required dependent components of the VNF $f_{r_h}$ must be migrated to the node $a_i$, then a next VNF is placed, and updated status $s_{i+1}$ is recorded;

the aforementioned process continues until the SFCs are successfully deployed or migrated; a reward is computed based on deployment results; if the deployment is successful, a reward for successful deployment is computed; if the migration is successful, a reward for successful migration is computed; if the deployment or migration of the SFCs fails, the system is restored to last successfully reached status $s_{i-u+1}$.

Beneficial effects: In the method described in the present disclosure, the mobility of terminal users and the service requests from mobile terminal users are comprehensively considered. First, a network architecture is constructed for SFC deployment and migration that accounts for VNF-dependent component migration. Then, based on the architecture, a joint method for SFC deployment and migration with VNF-dependent component migration is proposed. The method includes: acquiring SFC request information, determining access nodes, and designing SFC deployment and migration decisions together with a VNF-dependent component migration policy. Finally, experimental evaluations are conducted. The results demonstrate that, by jointly considering the interactions among VNF-dependent component migration, SFC deployment, and SFC migration decisions, the present disclosure enables highly efficient and high-performance mobile service delivery.

BRIEF DESCRIPTION OF THE DRAWINGS

FIG. 4A is a comparison graph of convergence of average acceptance rates of SFCs, and FIG. 4B is a comparison graph of convergence of policy gradient loss;

FIG. 5A illustrates average acceptance rates when speed=high and |F|=3, FIG. 5B illustrates average end-to-end communication delay when speed=high and |F|=3, FIG. 5C illustrates the average migration number of VNF-dependent components when speed=high and |F|=3, FIG. 5D illustrates the average migration cost of VNF-dependent components when speed=high and |F|=3, FIG. 5E illustrates the average placement cost of VNF-dependent components when speed=high and |F|=3, FIG. 5E illustrates average interruption delay of SFCs when speed=high and |F|=3, FIG. 5G illustrates the total migration number of VNF-dependent components when speed=high and |F|=3, FIG. 5H illustrates the total migration cost of VNF-dependent components when speed=high and |F|=3, and FIG. 5I illustrates the total placement cost of VNF-dependent components when speed=high and |F|=3;

FIG. 6A illustrates average acceptance rates when $\Gamma_d$=240 and |F|=3, and FIG. 6B illustrates average end-to-end communication delay when $\Gamma_d$=240 and |F|=3; FIG. 7A illustrates average acceptance rates when dis=2 and $\Gamma_d$=240, and FIG. 7B illustrates average end-to-end communication delay when dis=2 and $\Gamma_d$=240.

DETAILED DESCRIPTION

Figure 1:
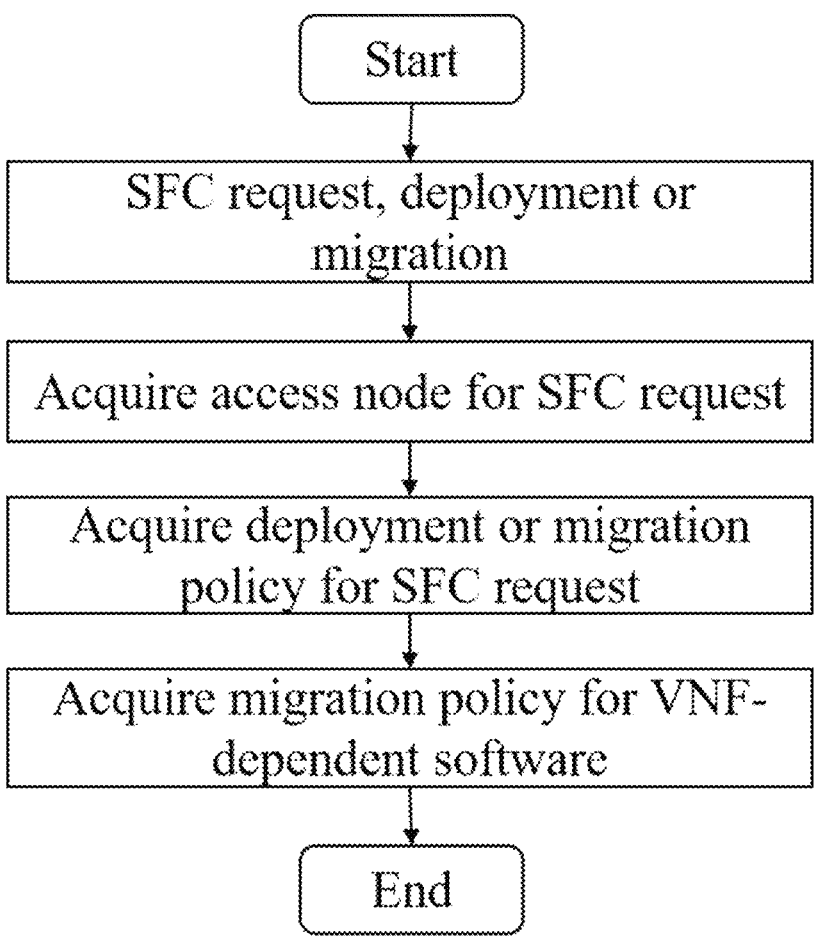
FIG. 1 is a schematic flowchart of the method according to the present disclosure.

To explain the technical solutions disclosed in the present disclosure in detail, the present disclosure will be further described below with reference to the drawings and embodiments.

The present disclosure provides a method for SFC deployment and migration based on VNF-dependent components. The method maximizes QoS mainly by improving service acceptance rate, reducing resource usage cost, and minimizing communication delay and interruption delay.

Although novel intelligent mobile devices, such as wearable devices, smart vehicles, robots, and unmanned aerial vehicles, have significantly enhanced our quality of life by offering greater convenience and improved efficiency, they have also resulted in an increase in computation-intensive tasks that demand higher computing capacity and performance, particularly concerning low delay and continuous communication. Given the limited resources of mobile devices, such as limited computing power and battery life, local processing of such tasks is generally infeasible. With the exponential growth in the number of mobile devices and the increase in data traffic generated by computation-intensive tasks, the future may witness intensified congestion in core networks. To address these challenges, offloading mobile services to edge servers located proximate to mobile terminals is a promising solution. This method not only enhances service quality by providing additional resources and reducing communication delay, but also facilitates alleviation of network congestion.

By integrating network function virtualization (NFV) technology, mobile services are represented by ordered virtualized network functions (VNFs), and these VNFs constitute service function chains (SFCs). The deployment of such SFCs is conducive to mitigating the challenges faced by resource-constrained edge nodes in accommodating large-scale and resource-intensive services such as high-definition video streaming, real-time gaming, and complex data analytics services, thereby increasing the success rate of mobile service offloading. However, the high mobility and uneven distribution of mobile devices result in significant spatiotemporal network load imbalance. In addition, all mobile devices compete for limited edge resources. Therefore, satisfying QoS requirements through SFC deployment is a challenging task requiring urgent resolution. To maintain service continuity during the movement of mobile devices, seamless SFC migration is essential, which further complicates service delivery.

In previous studies, VNFs have been implemented in the form of packages, and function instantiation is achieved by placing these VNF packages on servers. However, in large-scale heterogeneous edge networks, the diversity of virtualization platforms and the frequent iterative updates of VNFs require decoupling features for VNF packages. The decoupling of VNF packages is critical for flexible and efficient VNF placement, thereby ensuring rapid adaptation to ever-changing service demands. The deployment or migration of SFCs requires deploying VNFs on servers possessing necessary component resources (e.g., Ubuntu, VEKET, IPFilter, and Hash Switch), collectively referred to as VNF-dependent components, to support the operation of VNFs. In prior SFC deployment or migration processes, assuming that every server node can support the operation of all VNFs is impractical, particularly in light of the limited resources of edge server nodes.

When the node hosting a VNF lacks necessary components to support its operation, the VNF-dependent components may be migrated to the corresponding server node to enable normal operation of the VNF. The deployment and migration of SFCs are inherently complex processes. The incorporation of VNF-dependent component migration, while more accurately reflecting real-world scenarios, further exacerbates challenges in mobile service provisioning.

When considering VNF-dependent components, component reuse and migration policies during the SFC deployment process must be evaluated to ensure optimal VNF operation. Reusing component resources can reduce storage costs but may lead to increased communication delay. In another aspect, the migration of components incurs migration and storage costs, but may reduce communication delay. During the SFC migration process, it is essential to consider VNFs to be migrated and target migration nodes. The VNFs may be migrated to nodes that either support or do not support VNF operation. If the node does not support VNF operation, the VNF-dependent components must be also migrated to the node. Therefore, efficiently managing limited resources while delivering high-quality mobile services is an urgent problem to be solved.

The present disclosure provides a method for SFC deployment and migration based on VNF-dependent components. The method is based on a mobile user sending service request information to an SDN controller, and the SDN controller perceives the user request, tracks the location of the mobile user, coordinates SFC deployment and migration (including VNF-dependent component migration), and manages network resource allocation. User mobility, demands for high computing capacity and low delay, resource constraints of edge nodes, and challenges introduced by VNF-dependent component migration are considered. Due to the complexity of the problem, a deep reinforcement learning-based JSDM-VDSM architecture is provided to serve as the foundation for the design of the JSDM-VDSM algorithm. The algorithm includes a mechanism for determining an SFC to be migrated, a user access policy, SFC deployment and migration policies, and a VNF-dependent component migration policy. Compared to conventional methods, the provided mechanism offers a more flexible, efficient, and adaptive solution, as it can intelligently adapt to dynamic and complex network environments. The performance of JSDM-VDSMA is evaluated through simulation experiments. The results demonstrate that the provided algorithm shows superior performance compared to the baseline algorithm, particularly in terms of service acceptance rate and end-to-end communication delay.

The implementation process of the technical solutions provided in the present disclosure is specifically described below.

The method described in the present disclosure implements the deployment and migration of SFCs with consideration of VNF-dependent component migration. The method mainly includes three elements: a mobile terminal user, a 3GPP-based MEC network, and an SDN controller. The mobile terminal user initiates service requests and moves over time, the MEC network server provides communication and computing resources for the mobile terminal user, and the SDN controller manages terminal users and network resources.

The main implementation process of the method described in the present disclosure is shown in FIG. 1. Based on the above technical solutions, the process is further described in detail in the embodiments, which specifically includes the following steps:

(1) Construction of Communication System Architecture

This embodiment constructs a communication system architecture including a mobile user, an edge server, and an SDN controller. The mobile user is mainly responsible for dynamically generating service demands, the edge server provides computing and communication services for the mobile user, and the SDN controller serves as a coordination and management role throughout the system, being responsible for real-time allocation of user service demands and edge server resources. Through the coordinated operation of the mobile user, the edge server, and the SDN controller, the architecture ensures efficient handling of complex resource scheduling and dynamic service requests within the network.

(2) Construction of User Request Model, Communication Model, and Computing Model This embodiment constructs a user request model, a communication model, and a computing model to provide a comprehensive description of the communication system. The user request model defines a deployment request and a migration request of the SFCs, and covers demands for bandwidth resources, computing resources, memory resources, and storage resources, as well as lifetime and communication delay requirements. The communication model designs a bandwidth allocation policy of the edge server in detail, and quantifies communication channel interference, data transmission rate, and transmission time. The computing model provides a theoretical basis for system performance analysis and optimization by addressing end-to-end communication delay, resource usage cost, and interruption delay of SFC migration.

(3) Formulation of Optimization Problem and Determination of Optimization Objective Based on the system architecture and relevant model information, this embodiment formulates an optimization problem and defines an overall optimization objective. The optimization problem primarily focuses on the user request model, the communication model, the computing model, and the topology information of the edge server, aiming to address extreme user demands and edge resource constraints. The optimization objective should not only satisfy user demands for mobility, high computing capability, and low delay, but also maximize the utilization of limited edge node resources, and effectively address the complexity and challenges of VNF-dependent component migration, thereby ensuring enhancement of both network performance and resource efficiency.

(4) Method for SFC Deployment and Migration Based on VNF-Dependent Component Migration This embodiment provides a method for SFC deployment and migration based on VNF-dependent components, and a network architecture is constructed on this basis. By introducing deep reinforcement learning technology, the method intelligently decides SFC migration mechanisms, user access policies, and SFC deployment and migration policies, while simultaneously optimizing VNF-dependent component migration. Compared to conventional methods, the method not only better adapts to dynamic and complex network environments, but also significantly reduces migration delay and improves the flexibility and efficiency of resource allocation, thereby offering critical support for efficient future network communication management.

The implementation process of the method is described in detail below:

1) Construction of Communication System Architecture

The architecture includes three distinct layers: a mobile user (MU) layer, an MEC layer, and a software-defined networking (SDN) control layer. The architecture consists of a mobile user, an edge server, and an SDN controller to satisfy communication and computing demands in dynamic network environments. In this architecture, the mobile user interacts with the system by generating service demands (e.g., computing tasks or data transmission requests); the edge server is deployed at locations close to the user and configured to provide low-delay and high-performance services to the user by allocating computing resources, storage resources, and bandwidth resources; and the SDN controller, as the core unit for global resource scheduling, monitors in real time the service demands of the user, network topology information, and the resource status of the edge server, and intelligently optimizes resource allocation and scheduling policies. In the communication process, the requests from the mobile user are first parsed by the SDN controller, which, based on user demand types and current network conditions, dispatches the requests to the optimal edge server, thereby achieving efficient utilization of computing and communication resources. The architecture demonstrates flexibility in resource management and rapid response capability to user demands in dynamic environments through simulation of varying user demands and network scenarios.

Specifically, the operation time is divided into discrete time slots $T=\{1, 2, \ldots, t, \ldots, T\}$, with a time interval of $\Delta$.

MU (mobile user): Let $MU=\{u_1, u_2, \ldots u_r, \ldots, u_{|MU|}\}$ denote the set of mobile users. Each mobile user generates one computation-intensive SFC request within time T. The position of a mobile user $u_r$ in a time slot t is denoted as $$l_{u_r}^t = \left(x_{u_r}^t, y_{u_r}^t\right).$$

In each time slot, the communication system processes both newly arrived requests and ongoing user requests, due to random arrival and mobility of the user. Therefore, for these newly arrived requests, corresponding SFCs are required to be deployed. For an existing user, migration may be required to ensure service continuity.

Edge server: Let $N=\{n_1, n_2, \ldots, n_i, \ldots, n_{|N|}\}$ denote the set of edge servers. Each edge server is located at a base station and is equipped with specific computing, memory, storage, and bandwidth resources, denoted as $$\phi_{n_i}^c, \phi_{n_i}^m, \phi_{n_i}^s, \text{ and } \phi_{n_i}^b,$$

respectively. These resources enable the server to provide communication and computing services to the mobile user. The location of the edge server is fixed with a height of 0. The location of the edge server is denoted as $l_{n_i}=(x_{n_i}, y_{n_i})$, where $x_{n_i}$ is the horizontal network coordinate of $n_i$, and $y_{n_i}$ is the vertical network coordinate. The definition of edge server coordinates facilitates the provision of precise geo-location information, which is critical to optimizing service options for the mobile user. Given limited edge server resources and constantly changing locations of the mobile user, the VNFs of an SFC may be hosted on different edge servers, and each server may serve different mobile users in different time slots.

Figure 2:
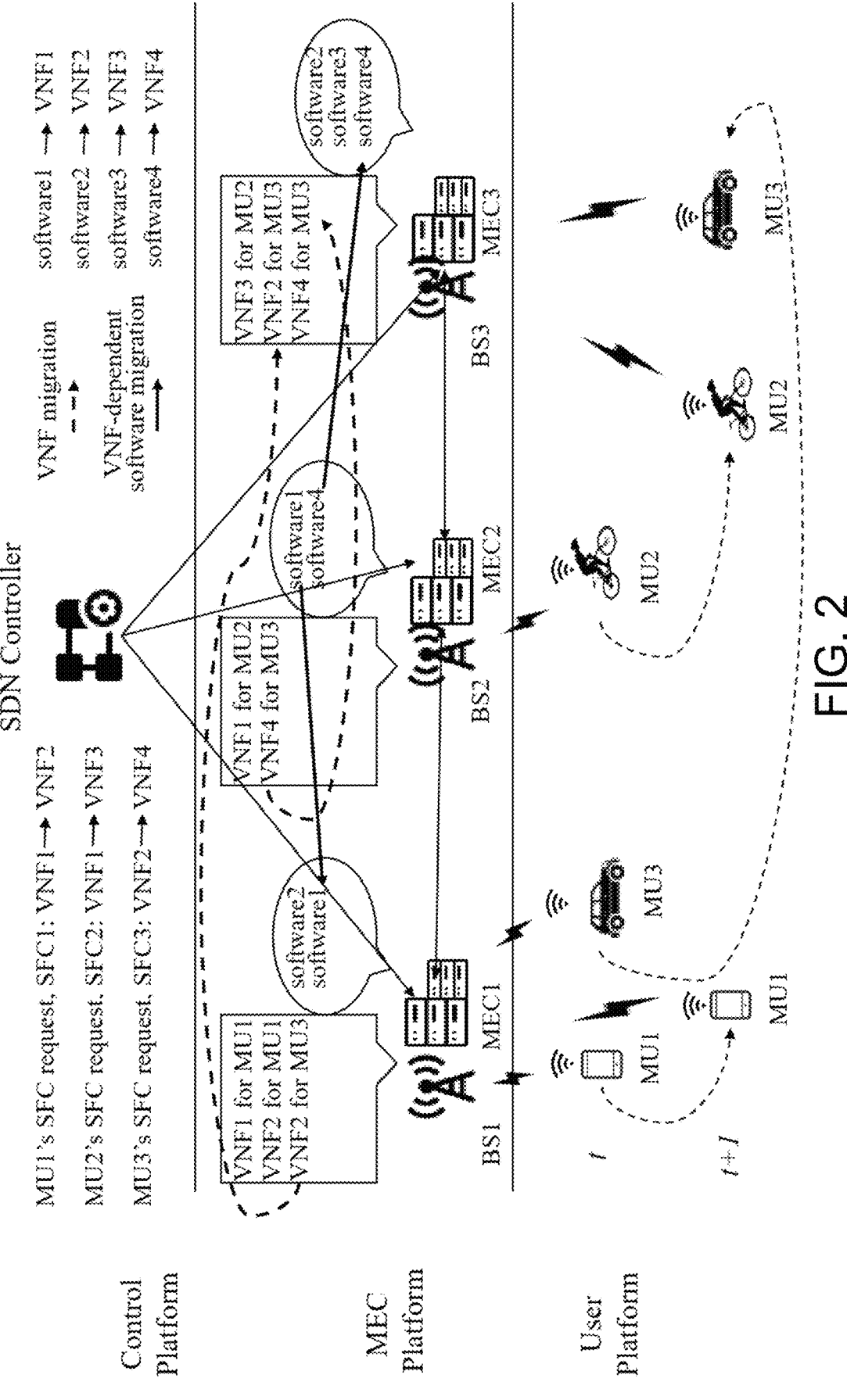
FIG. 2 is a diagram of an example of mobile service provisioning in an MEC system architecture according to an embodiment of the present disclosure.

Controller: The SDN controller plays a pivotal role in perceiving the user request, tracking the location of the mobile user, coordinating SFC deployment and migration (including VNF-dependent component migration), and managing network resource allocation. For example, as shown in FIG. 2, within the time slot t, the SDN controller receives newly arrived service requests from users 1, 2, and 3, and each user accesses the network via their respective base stations. The SDN controller is responsible for coordinating the deployment of the SFCs on the edge servers to satisfy the user requests. VNF1 and VNF2 of SFC1 are placed on MEC1, VNF1 of SFC2 is placed on MEC2, and VNF2 is placed on MEC3. For SFC3, VNF2 is placed on MEC1, and VNF4 is placed on MEC2. However, since MEC1 lacks the necessary component resources required to support the operation of VNF1, software1 is required to be migrated from MEC2 to MEC1 to ensure the normal operation of VNF1. In next time slot t+1, users 1, 2, and 3 have moved to new locations. User 1, moving relatively slowly, continues accessing services through the previous base station and edge server. User 2, moving at a moderate speed, modifies its access mode by adopting a rerouting policy. Meanwhile, user 3, moving at a relatively high speed, ensures service quality and continuity by strategically migrating VNFs and switching to a new access point. VNF2 of SFC3 is migrated from MEC1 to MEC3, and VNF4 of SFC3 is migrated from MEC2 to MEC3. However, since MEC3 does not possess the necessary components to support the execution of VNF4, software4 is required to be migrated from MEC2 to MEC3. During the SFC deployment and migration processes, the SDN controller manages the allocation and release of network resources to adapt to the continuously changing demands.

2) Construction of User Request Model, Communication Model, and Computing Model

For demands of the communication system, a user request model, a communication model, and a computing model are constructed to describe operating mechanisms and performance metrics of each part of the system.

User request model: User requests are classified into two types: an SFC deployment request and an SFC migration request. The SFC deployment request includes demands for bandwidth resources, computing resources, memory resources, and storage resources, and defines lifetime and communication delay requirements of the request. The migration request is mainly used in user mobility scenarios, and requires to migrate the currently deployed SFC to a new edge server while ensuring service continuity and low delay during the migration process.

Communication model: The communication model establishes computing methods for communication channel interference, transmission rate, and data transmission time by defining the bandwidth allocation policy of the edge server. Specifically, the communication model estimates channel capacity based on Shannon Formula and, considering interference and bandwidth resource status, computes the transmission rate and communication delay for each request.

Computing model: The computing model defines the computing method for end-to-end communication delay based on the analysis of computing resource allocation and usage costs of the edge server. In addition, the model further describes the interruption delay during the migration of the service function chains, and is used for evaluating the impact of migration policies on service performance. These models collectively provide a clear theoretical basis for the design of optimization algorithms.

Specifically, the user request is represented as an SFC request. To describe a mathematical processing process more clearly, in the present disclosure, any one user request is denoted as SFCr. The SFC request represents all user requests, and SFCr is a specific one in the SFC request.

$$\Gamma_r = (b_r, \overline{d}_r, TTL_r, G_r, \tau_r^s)$$

is defined as a 5-tuple of SFCr, where $b_r$ is defined as a bandwidth requirement, $\overline{d}r$ denotes a communication delay requirement, and $TTL_y = l \cdot \Delta$ denotes the lifetime of SFCr. The SFC is described as a directed graph $G_r = (F_r, E_r)$, where $F_r = \{f_{r1}, f_{r2}, \ldots f_{rh}, \ldots, f_{r|f_r|}\}$ denotes a set of VNFs in SFCr. Each VNF $f_{rh}$ requires a CPU resource $$R_{f_{rh}}^c$$

and a memory resource $$R_{f_{rh}}^n \cdot E_r$$

represents a virtual link of $SFC^r$. The arrival time of $SFC^r$ is denoted as $$\tau_r^s = m \cdot \Delta.$$

$\Gamma_d$ denotes a set of SFC deployment requests, and $\Gamma_m$ denotes a set of migration requests. In the present disclosure, the terms "base station", "edge server", and "physical node" are synonymous and can be used interchangeably. For SFC deployment, it is necessary to determine the base station through which the user accesses the network, the deployment locations of VNFs, the migration of VNF-dependent components, and the mapping paths of virtual links. The following notations are used:

The decision variable $$a_r^{n_i}$$

(t) in (1) determines whether to access the network via an edge server node $n_i$.

$$x_{f_{rh}}^{n_i}(t)$$

(in (2) determines whether to place VNF $f_{rh}$ on the edge server node $n_i$.

$$y_{\xi_{f_{rg},f_{rh}}}^{e_{ij}}(t)$$

in (3) is a binary variable indicating whether $\xi_{f_{rg},f_{rh}}$ is mapped to a link $e_{ij}$.

$$a_r^{n_i}(t) = \begin{cases} 1, & \text{if } r \text{ accesses network via } n_i, \\ 0, & \text{otherwise.} \end{cases} \quad (1)$$

$$x_{f_{rn}}^{n_i}(t) = \begin{cases} 1, & \text{if } f_{rh} \text{ is placed on } n_i, \\ 0, & \text{otherwise.} \end{cases} \quad (2)$$

$$y_{\xi_{f_{rg},f_{rh}}}^{e_{ij}}(t) = \begin{cases} 1, & \text{if } \xi_{f_{rg},f_{rh}} \text{ is mapped on } e_{ij}, \\ 0, & \text{otherwise.} \end{cases} \quad (3)$$

For SFC migration, it is necessary to determine the appropriate migration timing and whether access point switching is required, identify VNFs requiring migration, and determine whether migration of VNF-dependent components is required. $M_r$ denotes a set of VNFs to be migrated. Recording a source node $$M_{f_{rh}}^{sn}$$

on which each VNF to be migrated is placed, a memory dirtying rate $dir_{f_{rh}}$, and an occupied memory page size $$M_{f_{rh}}^m$$

is also critical. Furthermore, the target node $$M_{f_{rh}}^{dn}$$

to which the VNF is to be migrated needs to be carefully selected. $\Psi = \{\psi_1, \psi_2, \ldots, \psi_q, \ldots \psi_{|\Psi|}\}$ is a set of components that support VNF operation. $\Psi_{n_i}$ denotes a set of VNF-dependent components on an edge server node $n_i$. When a VNF is deployed on the edge server node $n_i$ or migrated to the edge server node $n_i$, if component resources required for supporting operation of the VNF are unavailable at the edge server node $n_i$, the VNF-dependent components must be migrated from other nodes to the edge server node $n_i$ to ensure normal operation of the VNF.

$$R^s_{\psi_\alpha}$$

denotes storage resources occupied by the VNF-dependent component $\psi_\alpha$. The binary variable $$z^{n_i}_{\psi_\alpha}$$

in (4) indicates whether the component $\psi_\alpha$ exists on the edge server node $$n_i \cdot \Psi^{mig}_{f_{rh}}$$

is used to denote the set of all components migrated for $f_{rh}$.

$$z^{n_i}_{\Psi_q} = \begin{cases} 1, \text{ if } \Psi_q \text{ is on } n_i, \\ 0, \text{ otherwise.} \end{cases} \tag{4}$$

The bandwidth resources of the edge server node $n_i$ are uniformly allocated to SFCr (MUr) to ensure fair allocation, expressed as:

$$w^r_{n_i} = \phi^b_{n_i} \cdot \frac{a^{n_i}_r}{\sum\limits_{r_j \in N_{n_i}} a^{n_i}_{r_j}}, \tag{5}$$

where $N_{n_i}$ denotes the set of MUs accessing $n_i$. The parameter $$\gamma^r_{n_i}$$

defined in formula (6) represents channel interference experienced by MUr when accessing the edge server node $n_i$, and the interference is generated due to channel contention caused by other MUs simultaneously accessing the same node. $p_{r_j}$ denotes the transmission capability of MUr$_j$, and $$H^{r_j}_{n_i}$$

denotes a channel gain influenced by the distance between MUr$_j$ and the edge server node $n_i$ and a power gain caused by a small-scale fading effect in the channel.

$$\gamma^r_{n_i} = \sum\limits_{r_j \in N_{n_i} \backslash \{r\}} p_{r_j} \cdot H^{r_j}_{n_i} \tag{6}$$

On this basis, the transmission rate between SFCr and the edge server node $n_i$ can be obtained by using the following formula:

$$\text{rate}^r_{n_i} = w^r_{n_i} \cdot \log_2\left(1 + \frac{p_r \cdot H^r_{n_i}}{\gamma^r_{n_i} + \rho^2}\right), \tag{7}$$

where $\rho^2$ denotes the signal-to-noise ratio. The transmission delay represented in formula (8) refers to time required for transmitting to-be-transmitted data of SFC$^r$ to the edge server node $n_i$.

End-to-end communication delay of SFC$^r$ is defined as the sum of data transmission delay, VNF processing delay, and link propagation delay, as shown below:

$$D_r = d^{trans}_r + \sum\limits_{f_{rh} \in F_r} x^{n_i}_{f_{rh}} \cdot d_{n_i} + \sum\limits_{\xi_{f_{rg} \cdot f_{rh}}} y^{e_{ij}}_{\xi_{f_{rg} \cdot f_{rh}}} \cdot d_{e_{ij}}. \tag{9}$$

During the SFC deployment process, certain costs are incurred due to usage of CPU and memory resources and migration of VNF-dependent components. As CPU and memory usage costs are inherent to the deployment process, this study mainly focuses on costs associated with the migration of VNF-dependent components. Therefore, the deployment costs of the SFCs are defined as follows:

$$C^d_r = \sum\limits_{f_{rh} \in M_r} \sum\limits_{\psi_q \in \Psi^{mig}_{f_{rh}}} \sum\limits_{p_{ij} \in L_{\psi_q}} y^{e_{ij}}_{p_{ij}} + \sum\limits_{f_{rh} \in M_r} \sum\limits_{\psi_q \in \Psi^{mig}_{f_{rh}}} x^{n_i}_{f_{rh}} \cdot c^{sto}_{n_i} \cdot R^s_{\psi_q} \tag{10}$$

where $L_{\psi_q}$ is a path used by a migration component $$\psi_q, y^{e_{ij}}_{p_{ij}}$$

is a binary variable indicating whether $P_{e_{ij}}$ on the path $L_{\psi_q}$ is mapped to a link $e_{ij}$, and $$c^{sto}_{n_i}$$

denotes unit storage costs of $n_i$.

The present disclosure adopts the pre-copy migration technology, which features flexible migration characteristics, minimized interruption time, and enhanced success rates. In the pre-copy migration technology, the interruption time is defined as duration of the final phase in the migration process, during which services are temporarily interrupted to complete final data synchronization.

$$d^{mig,s}_{f_{rh}}$$

denotes the start time of the interruption period, and $$d^{mig,e}_{f_{rh}}$$

denotes the end time of the interruption period. They are detailed in (11) and (12), respectively:

$$d_{f_{rh}}^{mig,s} = \sum_{q=1}^{\theta_{f_{rh}}} d_{f_{rh}}^q = \frac{M_{f_{rh}}^m}{b_{f_{rh}}} \cdot \frac{1 - \left(\dfrac{dir_{f_{rh}} \cdot M_{f_{rh}}^m}{b_{f_{rh}}}\right)^{\theta_{f_{rh}}}}{1 - \dfrac{dir_{f_{rh}} \cdot M_{f_{rh}}^m}{b_{f_{rh}}}}, \tag{11}$$

$$d_{f_{rh}}^{mig,s} = \sum_{q=1}^{\theta_{f_{rh}}+1} d_{f_{rh}}^q = \frac{M_{f_{rh}}^m}{b_{f_{rh}}} \cdot \frac{1 - \left(\dfrac{dir_{f_{rh}} \cdot M_{f_{rh}}^m}{b_{f_{rh}}}\right)^{\theta_{f_{rh}}+1}}{1 - \dfrac{dir_{f_{rh}} \cdot M_{f_{rh}}^m}{b_{f_{rh}}}}, \tag{12}$$

where $$d_{f_{rh}}^q$$

in (11) and (12) denotes the migration time of the q-th iteration, $\theta_{f_{rh}}$ denotes the actual number of iterations, and $b_{f_{rh}}$ denotes the migration rate of VNF $f_{rh}$. Therefore, the definition of interruption time is as shown in (13):

$$d_r^{inter} = \max\{d_{f_{rh}}^{mig,e}\} - \min\{d_{rh}^{mig,s}\}, f_{rh} \in M_r. \tag{13}$$

3) Formulation of Optimization Problem and Formulation of Optimization Objective Based on the user request model, the communication model, and the computing model, the optimization problem aims to address the following challenge: how to appropriately allocate the limited resources of the edge server in response to dynamically changing user requests while satisfying user demands for low delay and high computing capability. The optimization objectives include:

increasing service acceptance rate: maximizing the number of accepted user requests to ensure service capability of the system under high-load scenarios;

minimizing communication delay and migration delay: optimizing SFC deployment and migration policies to reduce end-to-end communication delay and mitigating impact of SFC migration process on user experience;

improving resource utilization rate: fully utilizing computing, bandwidth, and storage resources of the edge server while ensuring service quality, thereby avoiding resource waste; and addressing challenges of VNF dependency migration: for the dependency relationships among VNFs in service function chains and the dependency relationships between VNFs and the components, optimizing migration paths and policies to reduce the complexity and performance overhead caused by such dependencies.

Specifically, this step analyzes the constraints involved in SFC deployment and migration, particularly constraints related to VNF-dependent component migration, and then formulates the problem accordingly. Constraint (14) ensures that each $f_{rh}$ can only be successfully deployed on at most one server node, which means that VNF instances are indivisible:

$$\sum_{n_i \in N} x_{f_{rh}}^{n_i} \le 1, \forall r \in \Gamma_d \bigcup \Gamma_m, \forall f_{rh} \in F_r. \tag{14}$$

Communication quality among users connected to the network through the same node is mutually affected. Each physical node can accommodate at most $n_{max}$ users to maintain service quality for all users:

$$\sum_{r \in \Gamma_d \cup \Gamma_m} a_r^{n_1} \le n_{max}, \forall n_i \in N. \tag{15}$$

Constraints (16) and (17) ensure that on any edge server node $n_i$, the total CPU and memory resource requirements for SFC deployment and migration shall not exceed the maximum CPU and memory resource capacity:

$$\sum_{r \in \Gamma_d \cup \Gamma_m} \sum_{f_{rh} \in F_r} x_{f_{rh}}^{n_i} \cdot R_{f_{rh}}^c \le \phi_{n_i}^c, \forall n_i \in N, \tag{16}$$

$$\sum_{r \in \Gamma_d \cup \Gamma_m} \sum_{f_{rh} \in F_r} x_{f_{rh}}^{n_i} \cdot R_{f_{rh}}^m \le \phi_{n_i}^m, \forall n_i \in N. \tag{17}$$

Constraint (18) ensures that the used storage resources shall not exceed the maximum storage resource capacity:

$$\sum_{\psi_q \in \Psi_{n_i}} z_{\psi_q}^{n_i} \cdot R_{\psi_q}^s \le \phi_{n_i}^s, \forall n_i \in N, \tag{18}$$

where $\psi_{n_i}$ denotes a set of components on edge server node $n_i$.

Total bandwidth consumption on any link $e_{ij}$ must be less than the maximum bandwidth capacity. The condition is expressed as follows:

$$\sum_{r \in \Gamma_d \cup \Gamma_m} \sum_{\xi_{frg,f_{rh}} \in E_r} y_{\xi_{frg,f_{rh}}}^{e_{ij}} \cdot b_r \sum_{r \in \Gamma_m} \sum_{f_{rh} \in M_r} \sum_{p_{ij} \in L_{f_{rh}}} y_{p_{ij}}^{e_{ij}} \cdot b_{f_{rh}} \le b_{e_{ij}}, \tag{19}$$

$$\forall e_{ij} \in E,$$

where the first term represents a link bandwidth occupied by SFC deployment, and the second term represents a bandwidth used for SFC migration. To ensure the quality of service delivered, the delay constraint (20) ensures that the end-to-end delay of any SFCr must satisfy the following specific constraint:

$$D_r \le \bar{d}_r, \forall r \in \Gamma_d \bigcup \Gamma_m. \tag{20}$$

The definition of a JSDM-VDSM problem: the SFC deployment policy, the SFC migration policy (i.e., X, Y, and A), and the VNF-dependent component migration policy Z, significantly affects the quality of service provided. Under constraint conditions (14) to (20) and decisions concerning X, Y, A, and Z, the objective of the present disclosure is to maximize QoS by improving service acceptance rate, reducing resource usage cost, and minimizing communication delay and interruption delay. The optimization objective is defined as follows:

$$P1 \ \max_{X,Y,A,Z} \tag{21}$$

-continued $$\frac{1}{T}\sum_{t=1}^{T}\sum_{r\in\Gamma_d\cup\Gamma_m}Z_r(t)\cdot[w_1\cdot b_r - w_2\cdot C_r^d(t) - w_3\cdot D_r(t) - w_4\cdot d_r^{inter}(t)],$$

where $Z_r(t)$ is a decision variable used to determine whether the SFC r is accepted. If the SFCr is accepted, $Z_r(t)$ is set to 1 and otherwise set to 0, and $w_1$, $w_2$, $w_3$, and $w_4$ denote weights of different metrics.

4) Method for SFC Deployment and Migration Based on VNF-Dependent Component Migration This step also provides a method for SFC deployment and migration based on VNF-dependent components, as part of the method of the present disclosure, and constructs an intelligent network architecture driven by deep reinforcement learning.

A network architecture with consideration of VNF-dependent component migration (JSDM-VDSM) is constructed, including a mobile user access module, an edge server resource management module, and an SDN control module. This architecture supports dynamic user access, resource scheduling, and service migration, and models dependency relationships among different VNFs in the service function chains.

Design of deep reinforcement learning algorithm: An intelligent decision-making module is designed using deep reinforcement learning technology, which includes an SFC migration mechanism, a user access policy, SFC deployment and migration policies, and a VNF-dependent component migration policy. A reward function is defined to encourage the algorithm to maximize resource utilization rate, reduce migration delay, and ensure the integrity of the service function chain during the migration process.

Policy optimization and training: In a simulated environment, user requests and network resource status are generated as training samples, and the deep reinforcement learning model is used to continuously optimize the resource allocation policy. The optimization focuses on VNF migration paths, and VNF components with critical dependency relationships are preferentially migrated to ensure that service quality remains unaffected by the migration process.

The specific implementation process includes the following steps:

First, the JSDM-VDSM network architecture is described. A JSDM-VDSMA is further provided to obtain SFC deployment and migration policies that incorporate a VNF-dependent component migration policy.

Figure 3:
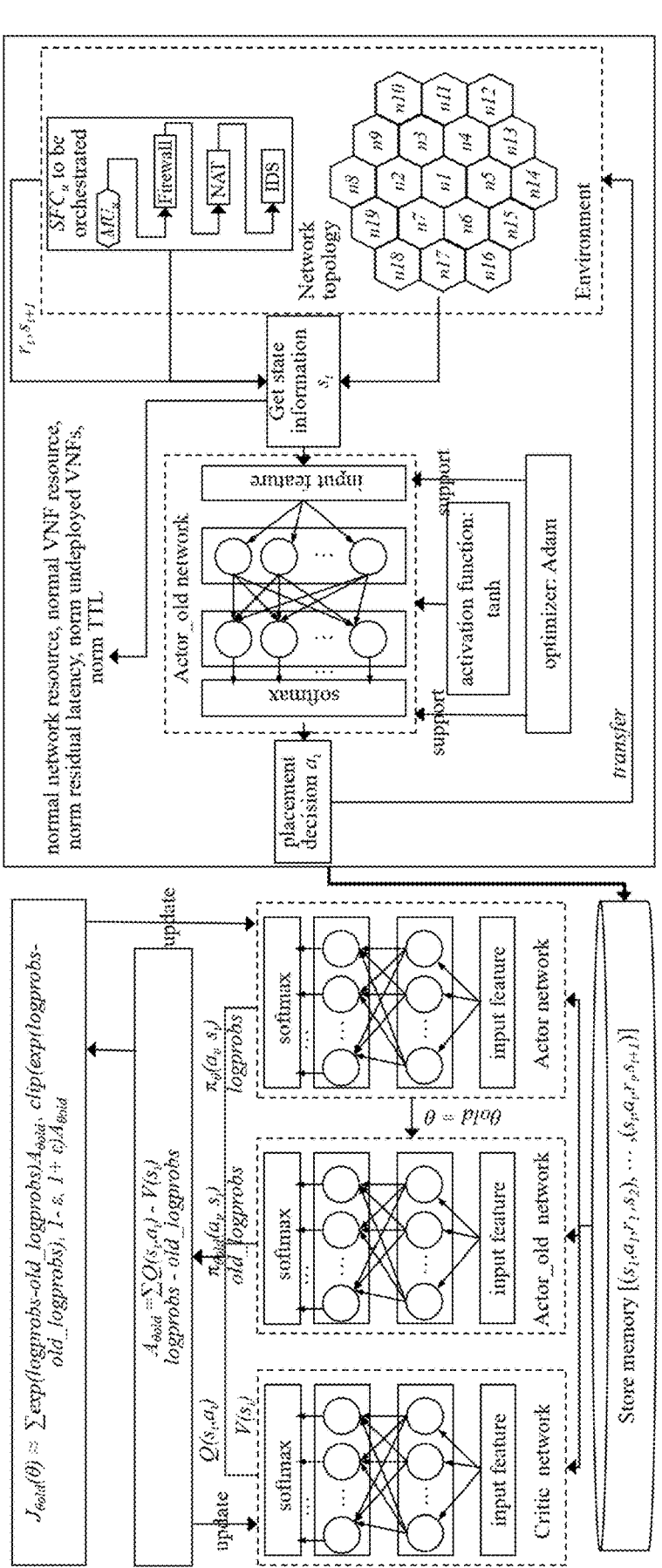
FIG. 3 is a diagram of a network architecture of SFC deployment and migration considering VNF-dependent component migration according to an embodiment of the present disclosure.

FIG. 3 illustrates a network architecture of JSDM-VDSM, which mainly includes two key steps: environment and training network. Due to the random arrival and mobility of the user, JSDM-VDSM adopts an online learning approach in dynamic network environments to dynamically determine A, X, Y, and Z.

Initially, the network architecture identifies SFCs that require orchestration, including SFCs requiring deployment and SFCs scheduled for migration. SFC deployment involves placing VNFs on physical nodes and mapping virtual links between the VNFs to corresponding physical links. In the migration process, the VNFs are migrated from original physical nodes to new physical nodes, and the SFCs are rerouted to improve service quality. Therefore, the SFC migration may be considered as joint optimization of VNF redeployment and SFC rerouting.

Next, the system acquires the status of the environment and the current SFCs to be orchestrated. The status includes available CPU, memory, storage, bandwidth, and component resources of physical nodes; CPU, memory, and component resource requirements of VNFs to be deployed; the number of VNFs not yet placed in the deployed SFCs; the partial communication delay of the current SFCs; and the TTL (lifetime) of the SFCs.

The acquired status $s_i$ is input into a network $Actor_{old}$ to obtain a VNF deployment decision $a_i$. Subsequently, iterative interaction with the environment is performed to collect a set of experimental data $[s_i, a_i, r_i, s_{i+1}]$ and store the same in the memory. An advantage function $A_{\theta_{old}}$ is computed based on the experimental data for use in updating a Critic network, and then a Actor network is updated using a clipped objective function $J_{\theta_{old}}(\theta)$. After multiple iterations, parameters of the Actor network are transferred to the network $Actor_{old}$. The iteration process continues until convergence is achieved.

The JSDM-VDSMA includes an algorithm for acquiring the SFC request, a method for determining a user access node A, a method for SFC deployment or migration policies X and Y, and a VNF-dependent component migration policy Z based on the policies X and Y. Prior to learning service provisioning policies, the SDN controller first collects global information and releases an SFC whose lifetime has expired, and then identifies the SFCs that require deployment or migration. The requested SFCs for deployment are SFC requests that randomly arrive within the current time slot t, and the requested SFCs for migration are SFC requests that meet the migration criterion within the same time slot. If no requests require processing, the controller proceeds to the next time slot to continue to acquire requests until $r_{batch}$ is non-empty. Subsequently, the SFC requests in $r_{batch}$ are deployed or migrated sequentially.

For deployment and migration requests, the selection of an access node for network communication is critical. This selection plays a key role in determining access delay, which is influenced by the remaining capacity of the node and the communication distance between the node and the user. Initially, user regions related to the SFC requests are determined, and then the controller evaluates whether the base station in the current region has sufficient capacity. If the base station has sufficient capacity, access is performed through the base station; if the base station does not have sufficient capacity, the controller plans connection via adjacent regions, firstly identifying adjacent regions, then computing access capacities of these regions. Subsequently, the number of accessible nodes with maximum access capacity is determined, and a region capable of accommodating the maximum capacity is selected. Then, one access node is selected from the accessible nodes max_num_node with probability $1-\epsilon$, and one access node is selected from a set of the accessible nodes n_max_num_node with probability $\epsilon$.

After the access point is selected, the SFC deployment or migration policies and the VNF-dependent component migration policy are determined. In this process, the first VNF of SFCr is identified first, the current status is then acquired, and the placement position of VNF $f_{rh}$ is determined based on a policy $\pi_{\theta_{old}}(a_i, s_i)$. If the VNF $f_{rh}$ can be placed on a node $a_i$, but components required for the operation of the VNF $f_{rh}$ are not currently available on $a_i$, the required dependent components of the VNF $f_{rh}$ must be migrated to $a_i$. Then, a next VNF is placed, and the updated status $s_{i+1}$ is recorded. This process continues until the SFCs are successfully deployed or migrated. A reward is computed based on deployment results, and if the deployment is successful, a reward for successful deployment is computed. If the migration is successful, a reward for successful migration is computed, and if the deployment or migration of the SFCs fails, the system is restored to last successfully reached status $s_{i-u+1}$.

Figure 4A:
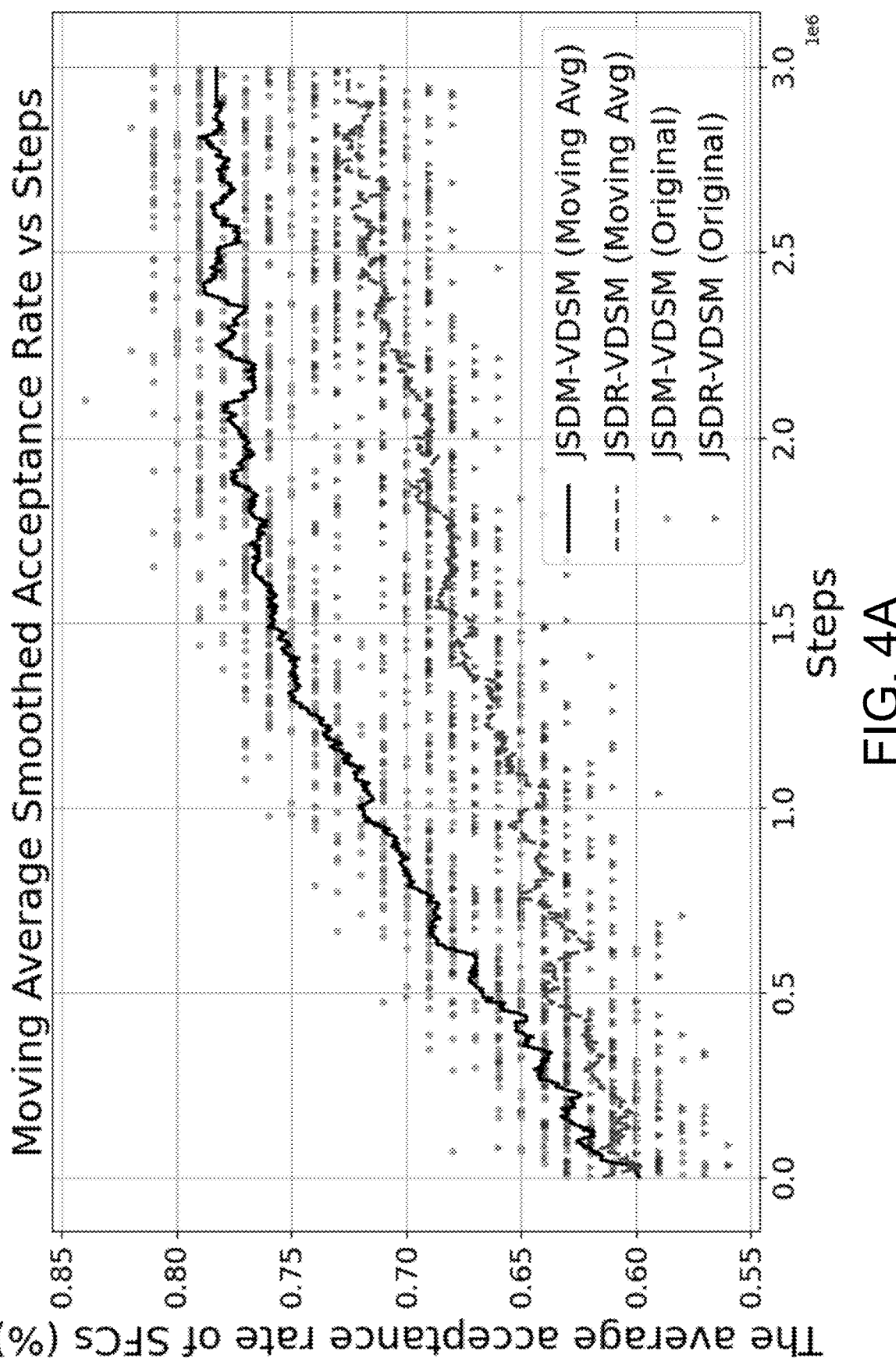
FIG. 4A and FIG. 4B are an algorithm convergence graphs according to an embodiment of the present disclosure, where
Figure 4B:
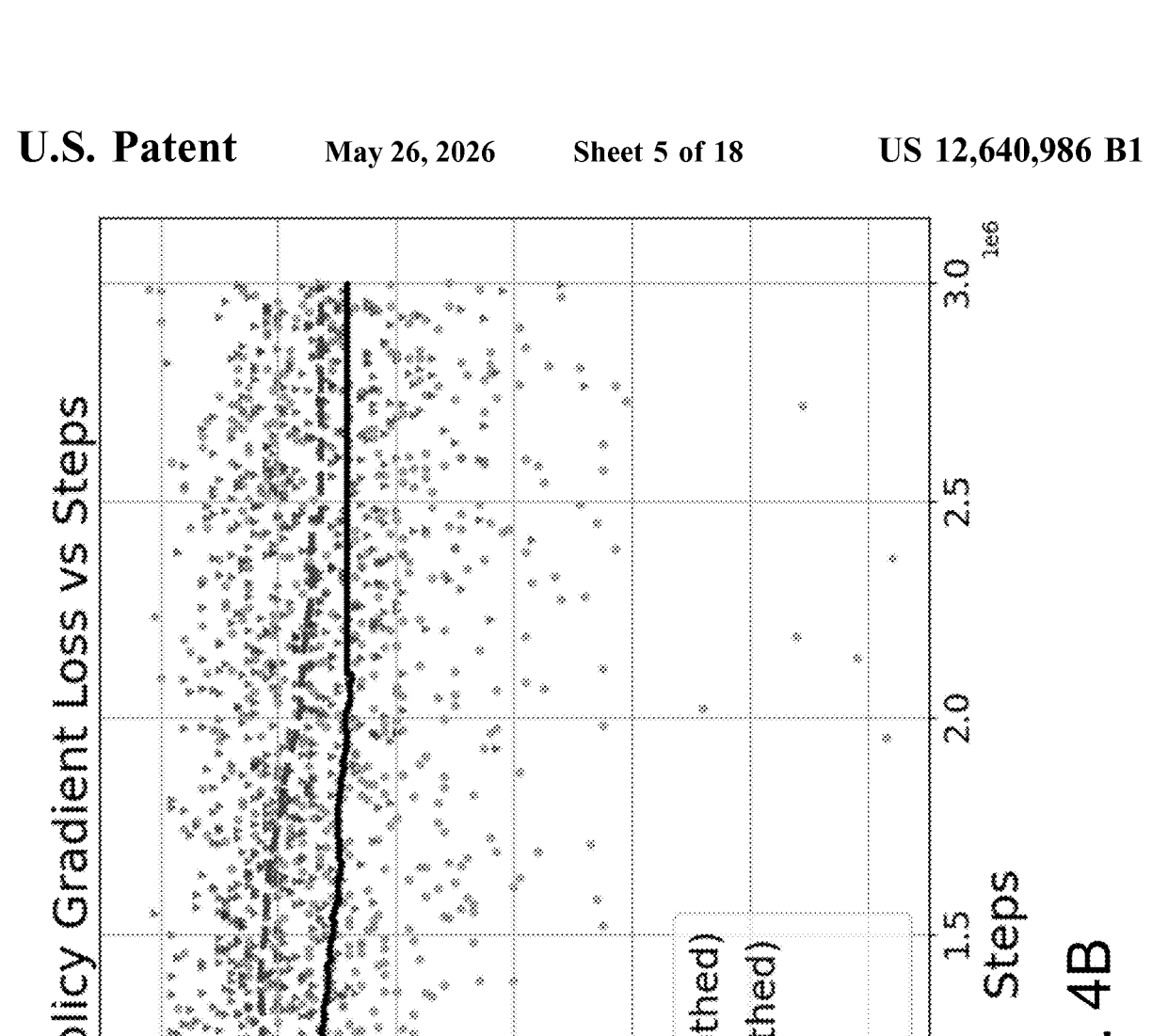

In this embodiment, to verify the practical effectiveness of the present disclosure, simulation experiments are conducted. To better illustrate the effectiveness of the present disclosure, a rerouting-based algorithm is used for comparison. FIG. 4A and FIG. 4B illustrate the convergence behavior of the JSDM-VDSMA and JSDR-VDSMA, highlighting the variation trends of acceptance rate and policy gradient loss. As shown in FIG. 4A, the average acceptance rate of the SFCs demonstrates a continuous upward trend as learning steps increase, eventually stabilizing at a steady value. Meanwhile, the policy gradient loss in FIG. 4B gradually decreases with increasing learning steps and finally converges to a stable state. This indicates that the learning processes of both algorithms are effective and stable. The experimental results indicate that, compared to conventional methods, the JSDM-VDSM method exhibits significant advantages in terms of communication delay, service continuity, and adaptability to dynamic environments. The effectiveness mainly includes the following aspects:

(1) Performance Analysis with Varying Numbers of SFC Requests

Figure 5A:
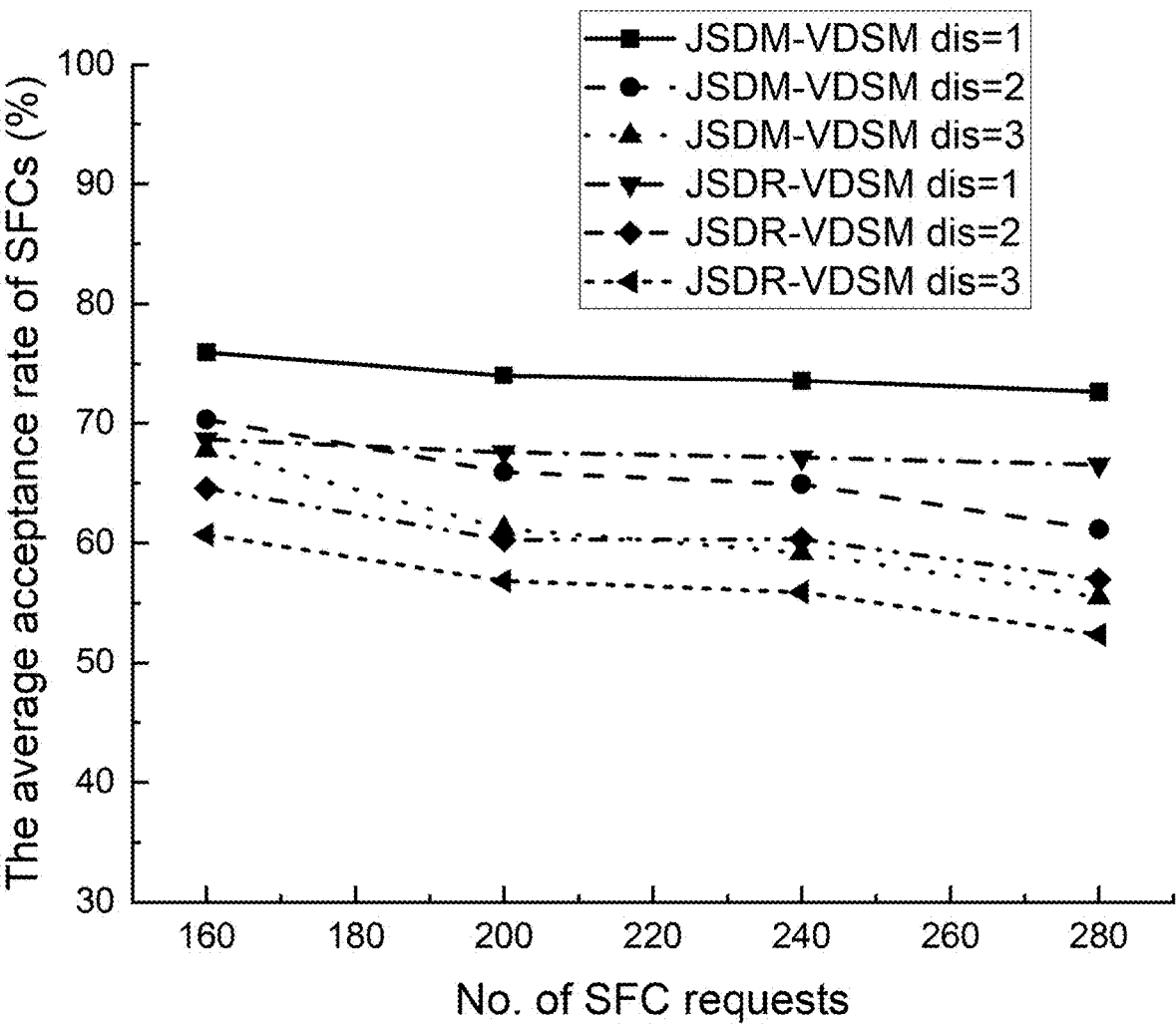
FIG. 5A to FIG. 5I are a schematic performance evaluation comparison diagrams of algorithms under varying numbers of service function chains and different migration conditions according to an embodiment of the present disclosure, where

FIG. 5A to FIG. 5I illustrate the performance evaluation of JSDM-VDSMA and JSDR-VDSMA algorithms under different migration conditions (i.e., dis, dis representing the SFC migration threshold) and varying numbers of SFC requests. In this evaluation, user movement speed is set as a relatively fast scenario (e.g., automobile, with a speed range of [135 km/h, 150 km/h]), and the length of the SFC is fixed at 3. As shown in FIG. 5A, the acceptance rate decreases as the number of SFC requests increases. This decrease is attributed to the fact that the growth rate of the number of the accepted SFCs is slower than the growth of the number of the SFC requests. However, the total number of accepted SFCs still increases. When the shortest hop distance between the last deployment region and the current region of an SFC is greater than or equal to the migration threshold dis, and the SFC is within its lifetime, the SFC is migrated. In addition, FIG. 5A also demonstrates that variations in the migration threshold dis lead to performance differences between the JSDM-VDSMA and JSDR-VDSMA algorithms.

For JSDM-VDSMA, as the migration threshold dis increases, the acceptance rate of the SFCs decreases. This is because all users generating SFC requests are assumed to move randomly from the center of the MEC network. As dis increases, the SFCs remain longer in their original access and deployment locations, leading to congestion at nodes near the center of the MEC network. When new SFC requests arrive at the MEC center, sufficient resources may not be available to support their deployment, resulting in a decrease in the acceptance rate. Conversely, SFC migration occurs more frequently when dis is relatively small. In this case, previously deployed SFCs are migrated to servers located farther from the MEC center, thereby releasing resources for new requests and increasing the acceptance rate of the SFCs. For JSDR-VDSMA, as the migration condition dis increases, the acceptance rate of the SFCs also decreases. In the MEC network, user QoS is interdependent. Therefore, the maximum number of users that can be accommodated by each base station is limited. As dis increases, access resources near the center of the MEC network are rapidly consumed. When new SFC requests arrive at the MEC center, sufficient resources cannot be provided to support their deployment, resulting in a decrease in the acceptance rate of the SFCs. An interesting observation is that, as can be seen from FIG. 5A, JSDM-VDSMA consistently outperforms JSDR-VDSMA in terms of SFC acceptance rate under all migration conditions. This superior performance is attributed to the fact that JSDM-VDSMA, upon reaching the migration threshold, not only switches the access nodes but also migrates the VNFs, thereby ensuring optimal performance of the SFCs. In contrast, JSDR-VDSMA only switches the access nodes without migrating the VNFs, resulting in relatively lower performance.

Figure 5B:
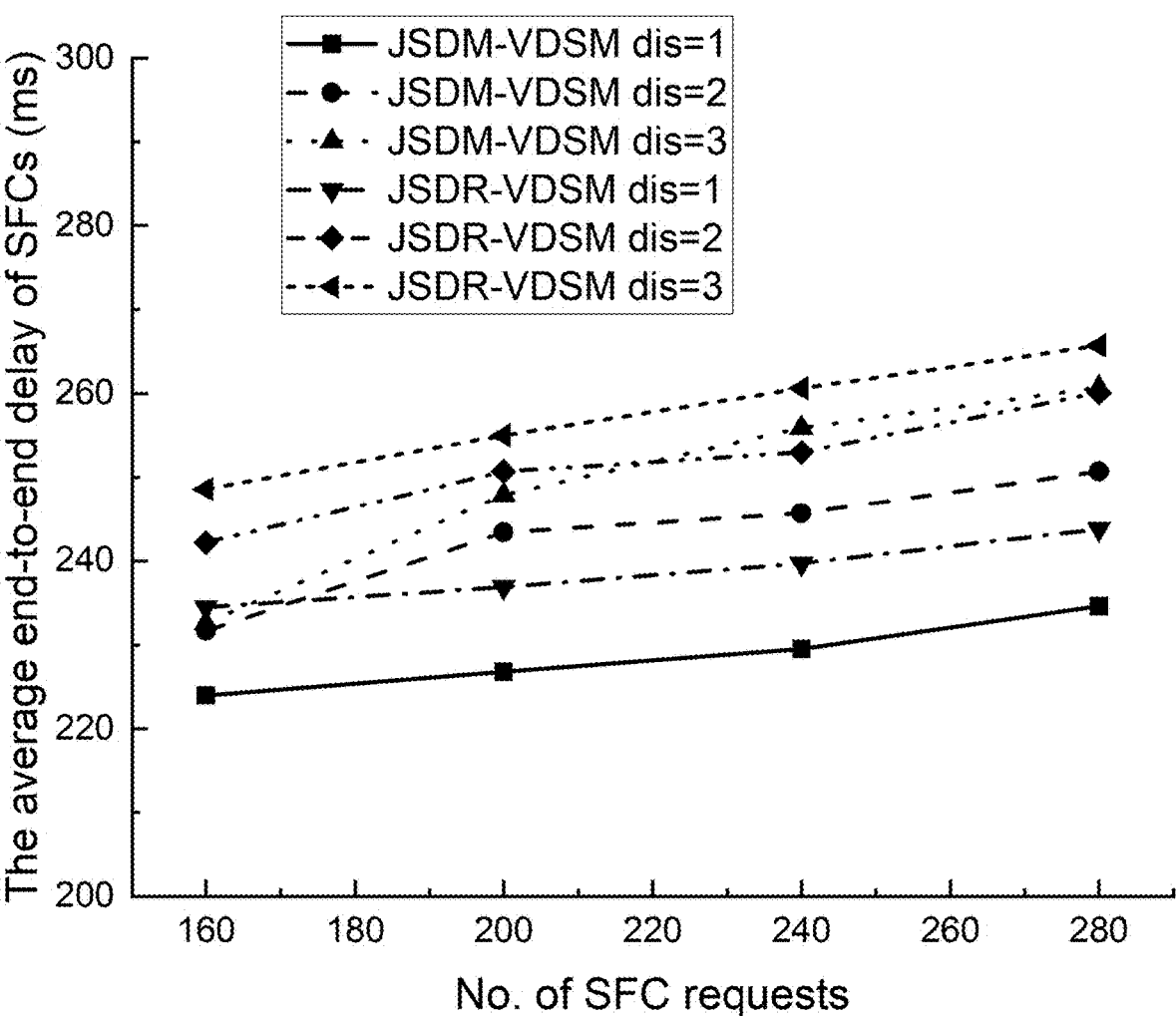

FIG. 5B illustrates the end-to-end communication delay, from which it can be observed that as the number of SFC requests increases, the delay also increases. This is because the increased number of accepted SFCs leads to an increase in access delay, processing delay, and link delay. In addition, FIG. 5B also demonstrates that as the migration condition dis increases, the delay of both JSDM-VDSM and JSDR-VDSM algorithms increases. This is because a higher dis reduces the frequency of SFC migration, meaning that when users move to farther locations, they still communicate via the original access nodes and the previously deployed SFCs, thereby resulting in higher access delay. Thus, an increase in dis results in an increase in the overall delay.

Under different migration conditions, JSDM-VDSMA consistently outperforms JSDR-VDSMA in terms of delay. This is because during the SFC migration process, JSDM-VDSMA not only switches the access nodes but also migrates the VNFs, thereby providing more high-quality resources for newly arrived SFCs requiring deployment, which reduces the overall delay and demonstrates better performance compared to JSDR-VDSMA.

Figure 5C:
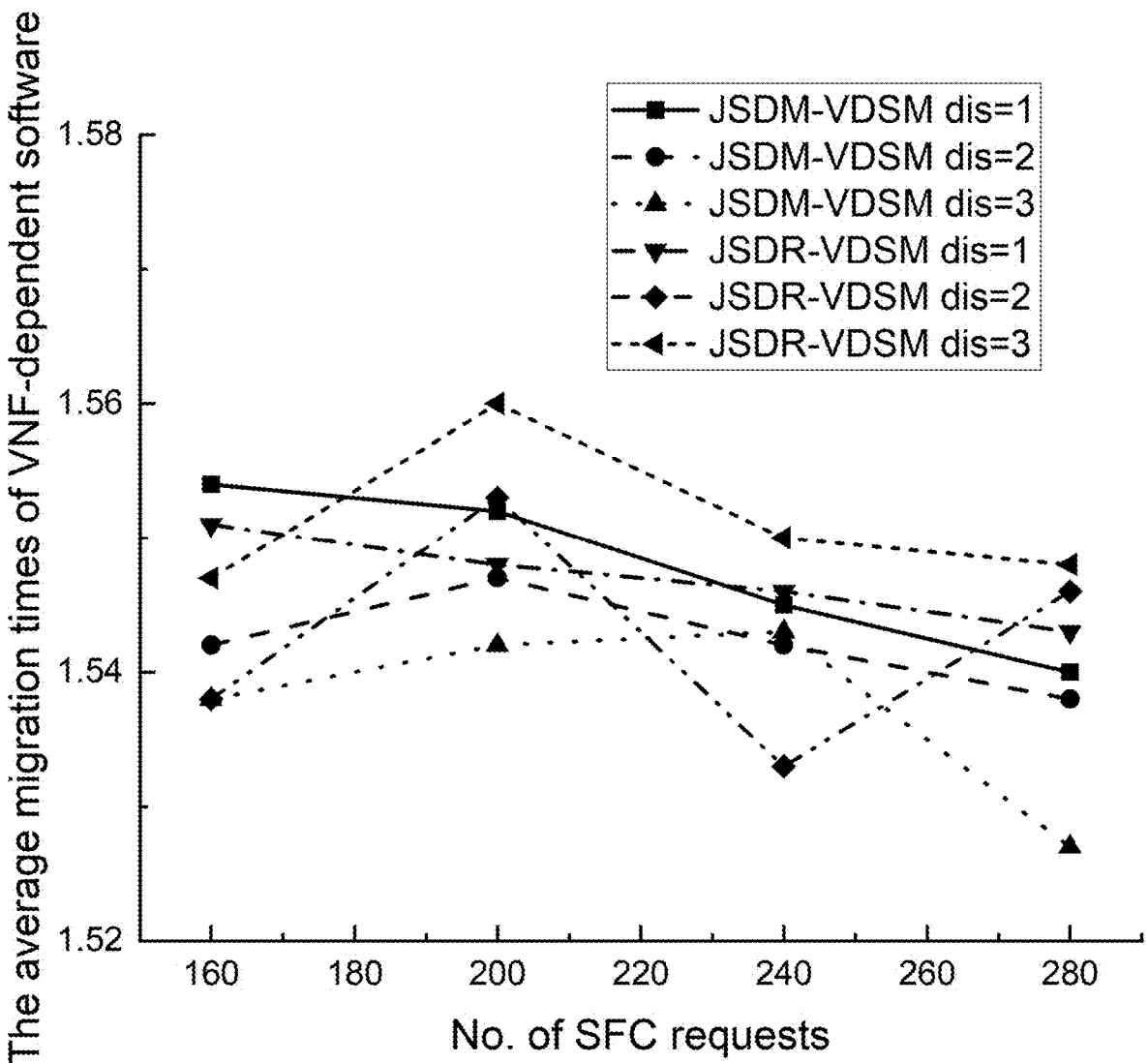
Figure 5D:
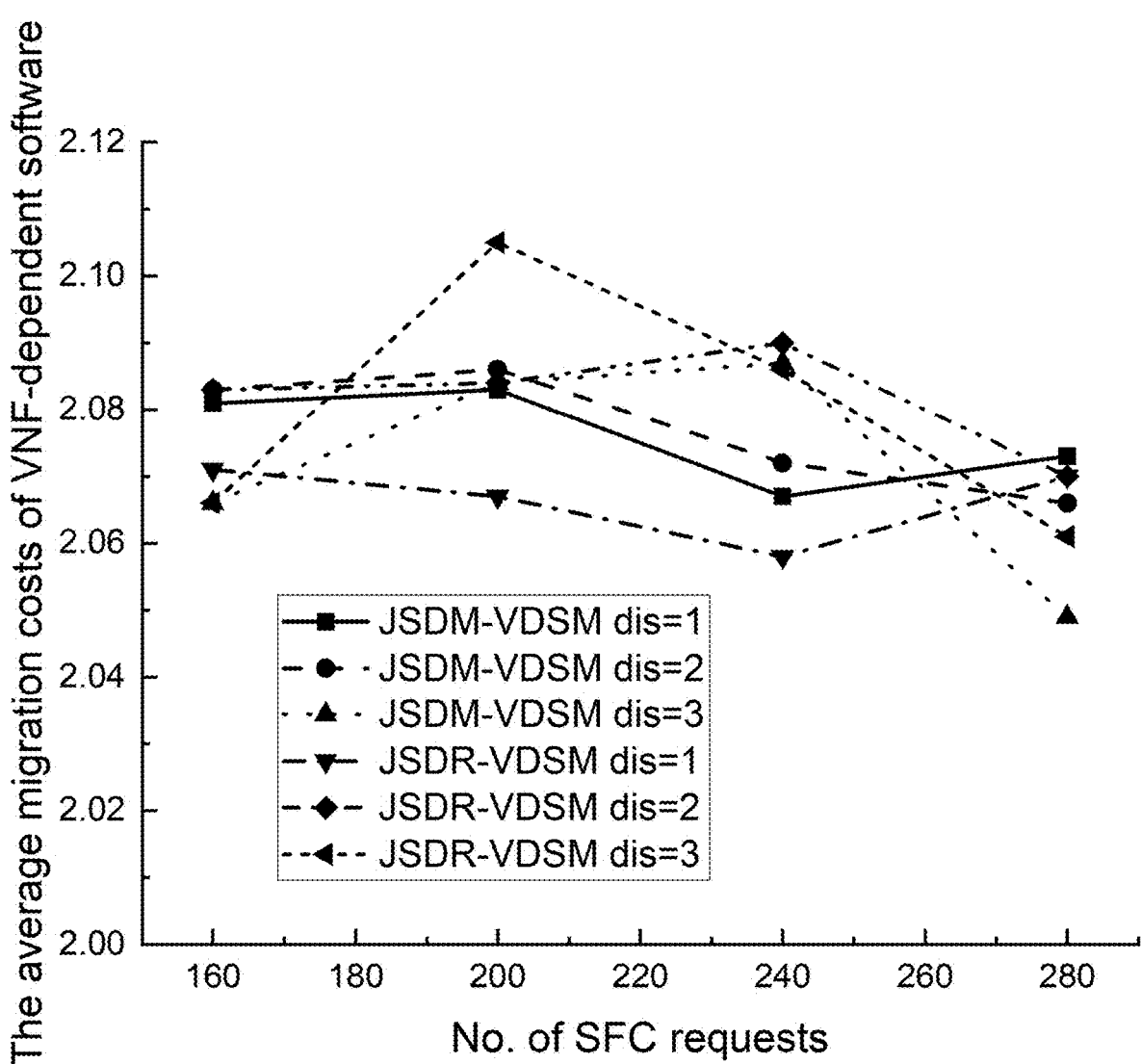
Figure 5E:
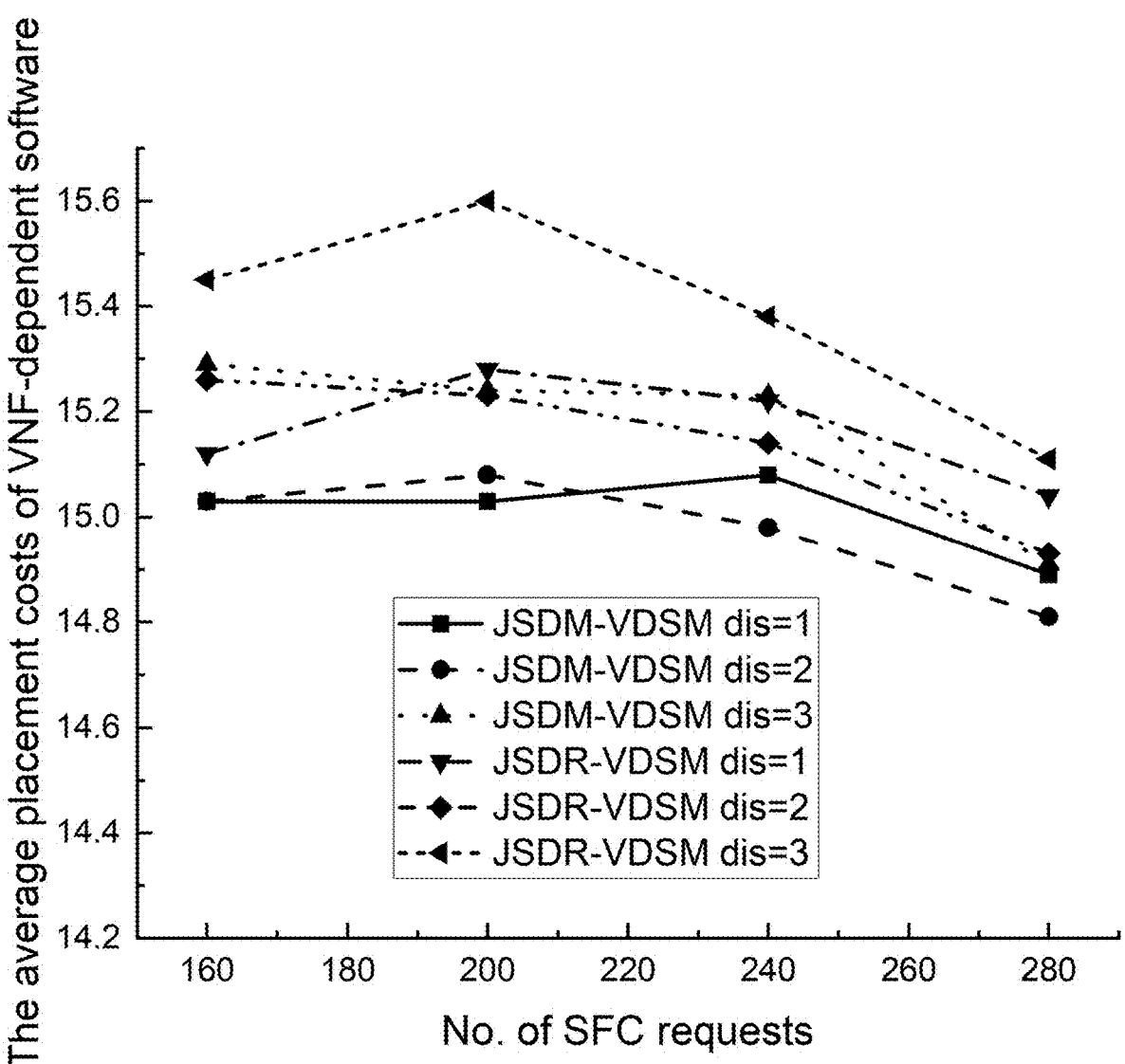
Figure 5F:
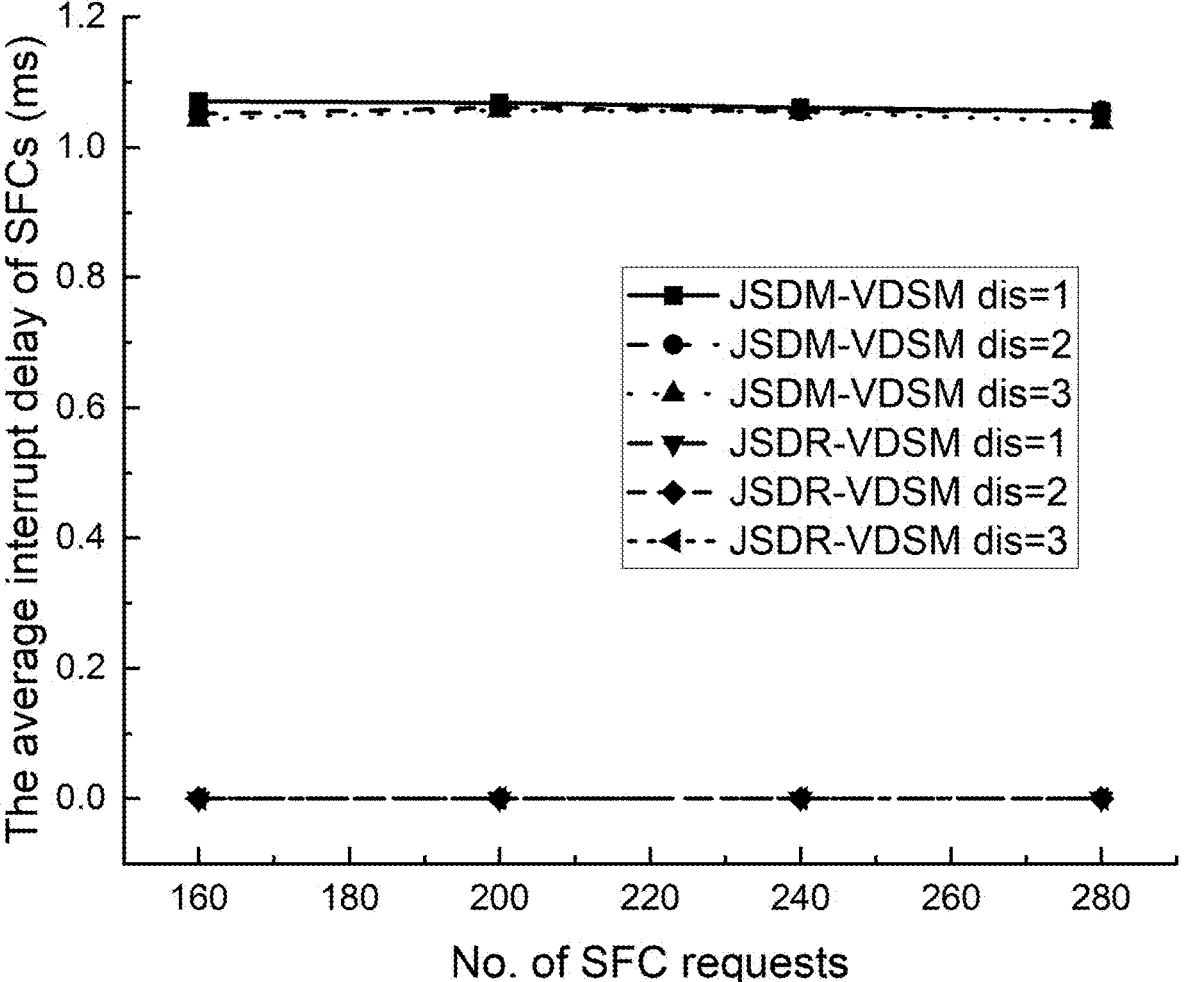

FIGS. 5C, D, E, and F respectively illustrate the average migration number of SFCs, the average migration cost, the average placement cost of VNF-dependent components, and the average interruption delay of SFCs, where the formula for the interruption delay is defined in (13). As shown in FIG. 5C, under different migration conditions, the average migration number of VNF-dependent components in JSDM-VDSM and JSDR-VDSM algorithms is comparable, approximately half the SFC length. FIG. 5D demonstrates that, under different migration conditions, the average migration cost of VNF-dependent components is also similar for both the JSDM-VDSM and JSDR-VDSM algorithms. The migration cost of the VNF-dependent component is defined as the shortest path for migrating the VNF-dependent component. In FIG. 5E, it can be clearly seen that, under different migration conditions, JSDM-VDSMA consistently outperforms JSDR-VDSMA in terms of the placement cost of VNF-dependent components. Finally, FIG. 5F demonstrates that the interruption delay of JSDM-VDSMA under different migration conditions remains unchanged. This is because, by definition the computation of the interruption delay is independent of the migration condition $$\left(\text{i.e., } dir_{frh}, M_{frh}^m, \text{ and } b_{frh}\right).$$

Figure 5G:
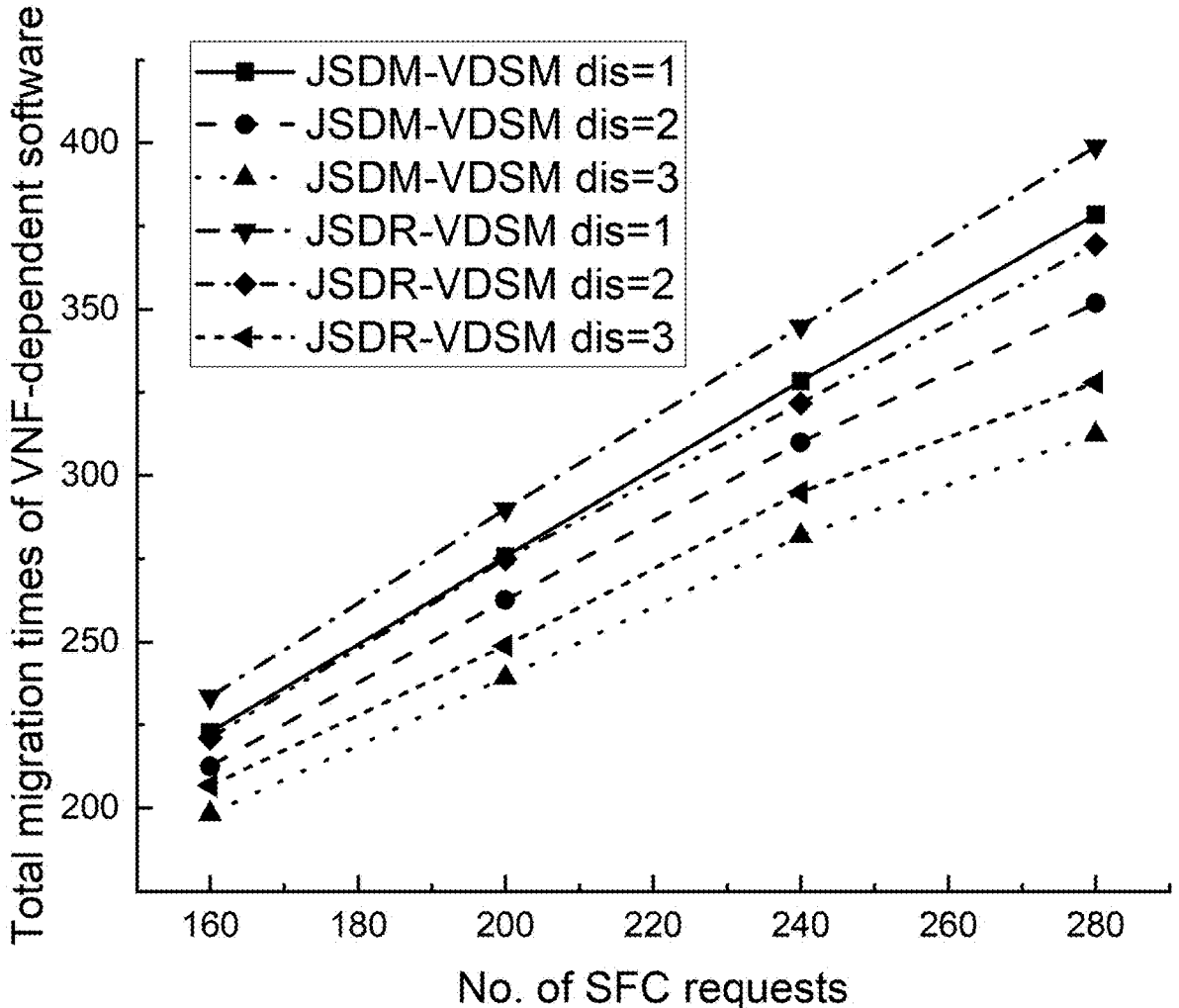
Figure 5H:
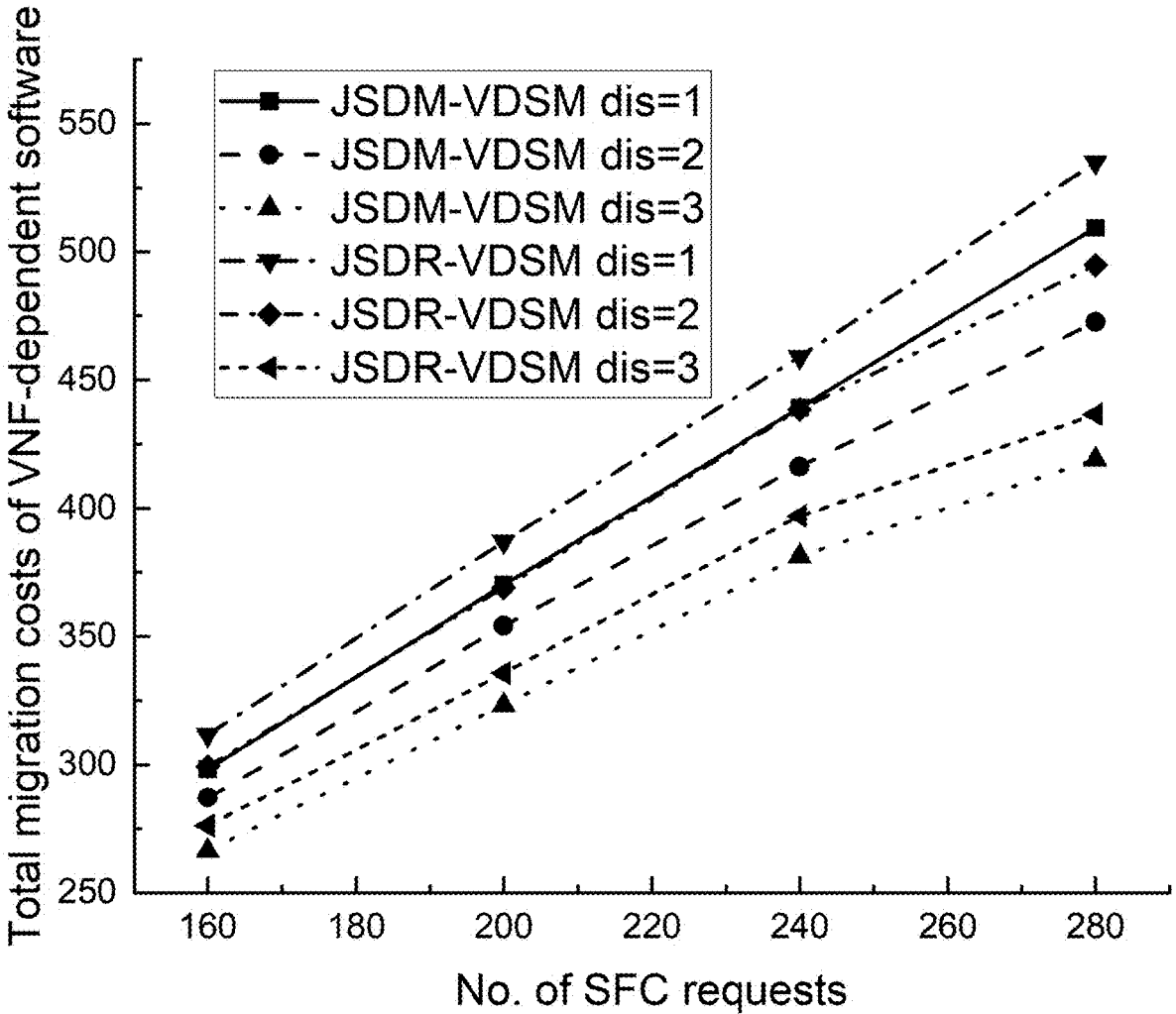
Figure 5I:
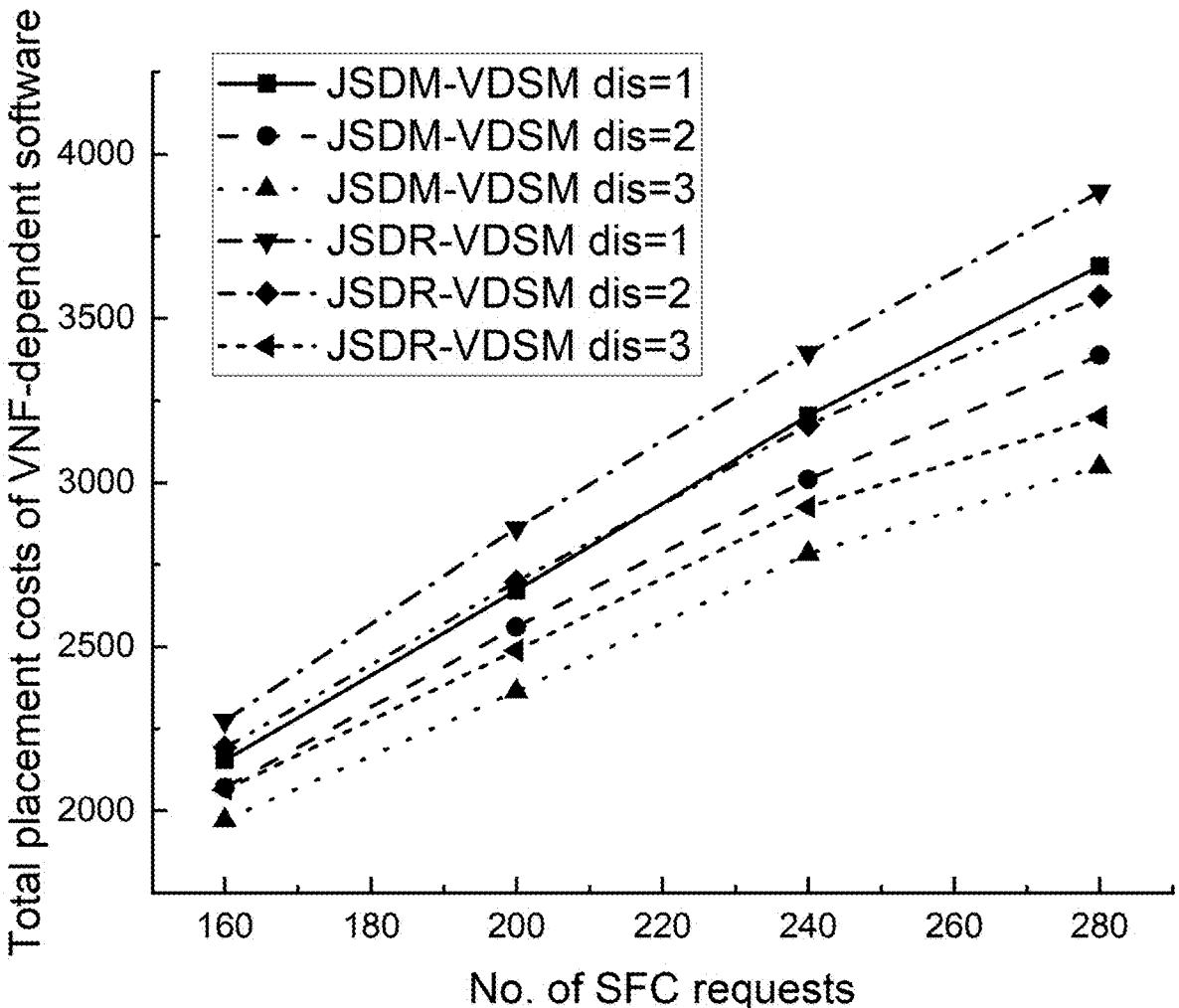

FIGS. 5G, H, and I respectively illustrate the total migration number, the total migration cost, and the total placement cost of VNF-dependent components. These results clearly demonstrate that, under different migration conditions, the JSDM-VDSM algorithm consistently outperforms the JSDR-VDSM algorithm. Moreover, as the number of SFC requests increases, the total migration number, the total migration cost, and the total placement cost of VNF-dependent components increase significantly.

(2) Performance Analysis with Different Movement Speeds

Figure 6A:
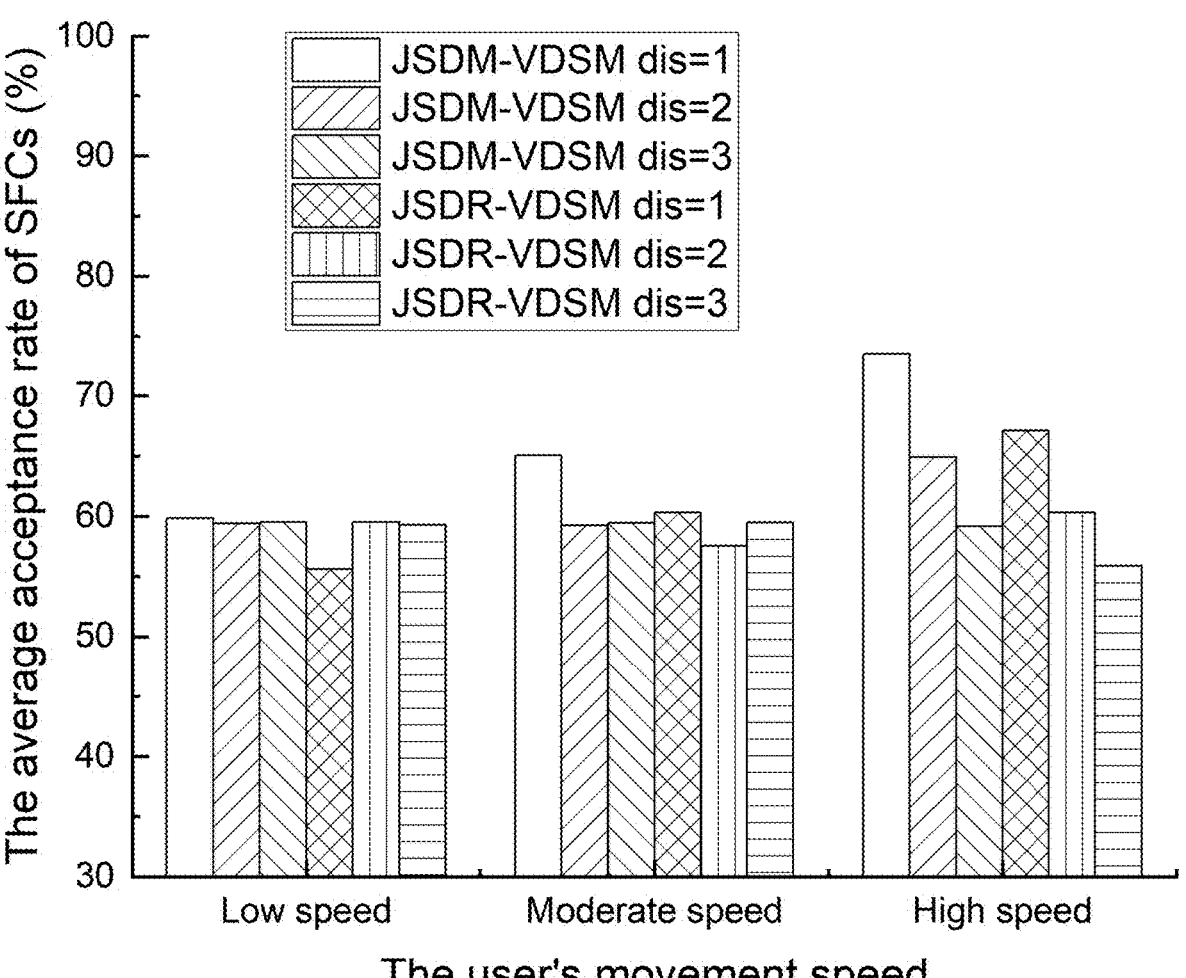
FIG. 6A and FIG. 6B are schematic performance evaluation comparison diagrams of algorithms under different migration conditions and varying user movement speeds according to an embodiment of the present disclosure, where
Figure 6B:
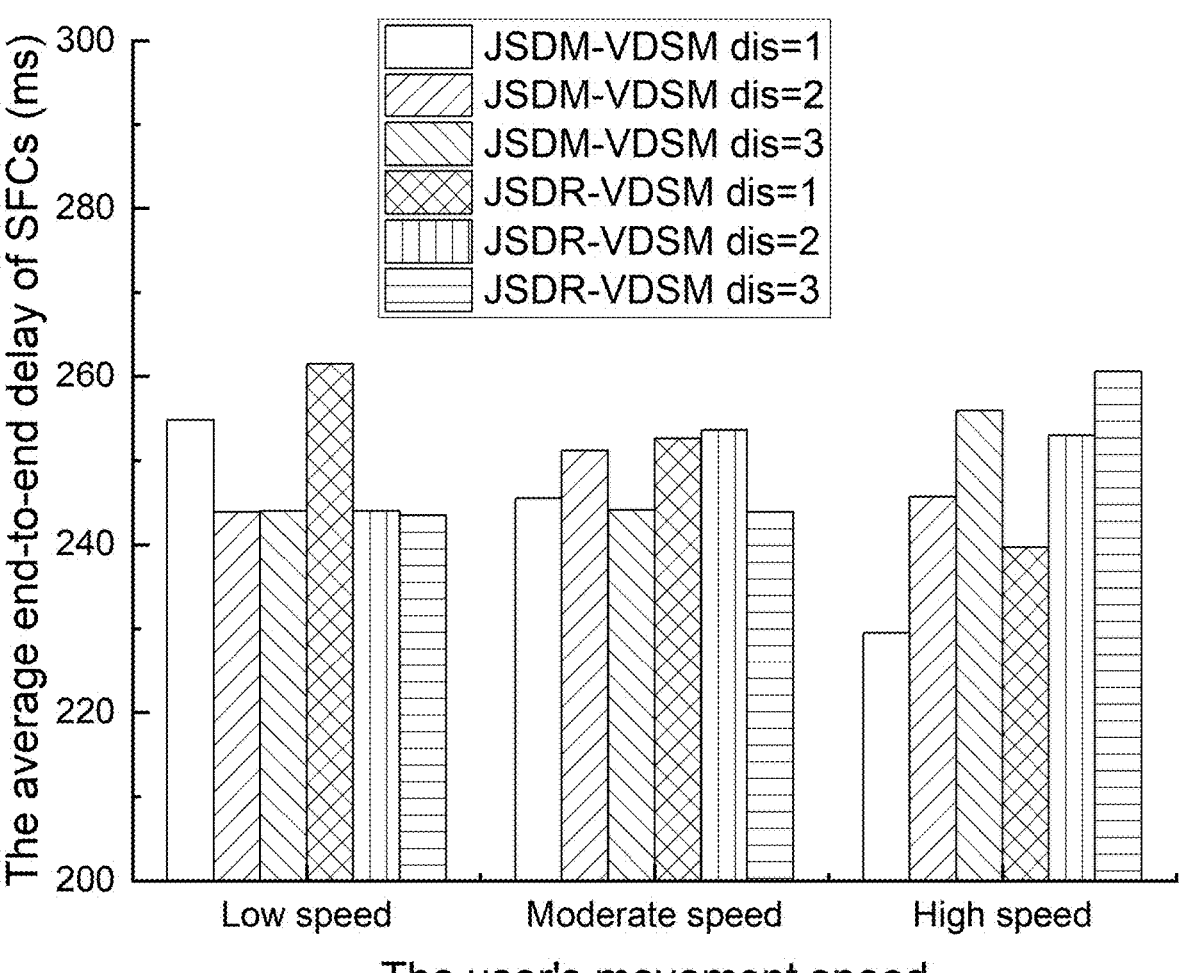

FIG. 6A and FIG. 6B illustrate the performance evaluation of JSDM-VDSM and JSDR-VDSM algorithms under different migration conditions and user movement speeds. In this evaluation, the number of SFCs is fixed at 240 and each SFC has a length of 3. FIG. 6A demonstrates that, under various migration conditions, JSDM-VDSMA consistently outperforms JSDR-VDSMA in terms of SFC acceptance rate.

For JSDM-VDSMA, when dis is set to 1 or 2, the SFC acceptance rate increases as the user movement speed increases. This is because higher speeds increase the probability of satisfying the migration condition (dis=1 or 2), thereby increasing opportunities for SFC migration. The SFC migration releases resources that can be allocated to newly arrived SFC requests, thus improving acceptance rate. Conversely, when dis=3, the acceptance rate remains almost unchanged. This is because even at a relatively high movement speed, it is difficult for the SFC to satisfy the condition of dis=3 within its limited lifetime. Therefore, the probability of SFC migration is relatively low at all movement speeds, and the acceptance rate remains stable. Similarly, for JSDR-VDSMA, when dis=1, the acceptance rate increases as the user movement speed increases. However, when dis=2 or 3, the acceptance rate remains almost unchanged for reasons similar to JSDM-VDSMA.

FIG. 6B illustrates the end-to-end delay, and reveals that, under various constraint conditions, JSDM-VDSMA consistently outperforms JSDR-VDSMA in reducing delay. For the JSDM-VDSM and JSDR-VDSMA algorithms, when dis=1, the delay decreases as the user movement speed increases. This is because the migration condition of dis=1 can be more easily satisfied under higher speeds, thereby allowing SFC migration. In this way, the VNFs can be migrated to more suitable nodes, and acquire more suitable access nodes, thereby reducing delay. However, when dis=3, the delay increases as the speed rises. This is due to the difficulty in satisfying the threshold of dis=3 even under high speed conditions. Consequently, users continue connecting through the original access nodes even they are geographically farther, leading to increased access delay and higher end-to-end delay. When dis=2, under medium speed conditions, both algorithms exhibit relatively higher delay. This is because, compared to high-speed mobility, the probability of satisfying the migration condition of dis=2 is lower. In addition, compared to low-speed mobility, the distance between the current location of the user and the access node is larger, causing higher access delay. Thus, the end-to-end delay increases significantly under this medium-speed scenario.

(3) Performance Analysis with Varying SFC Lengths

Figure 7A:
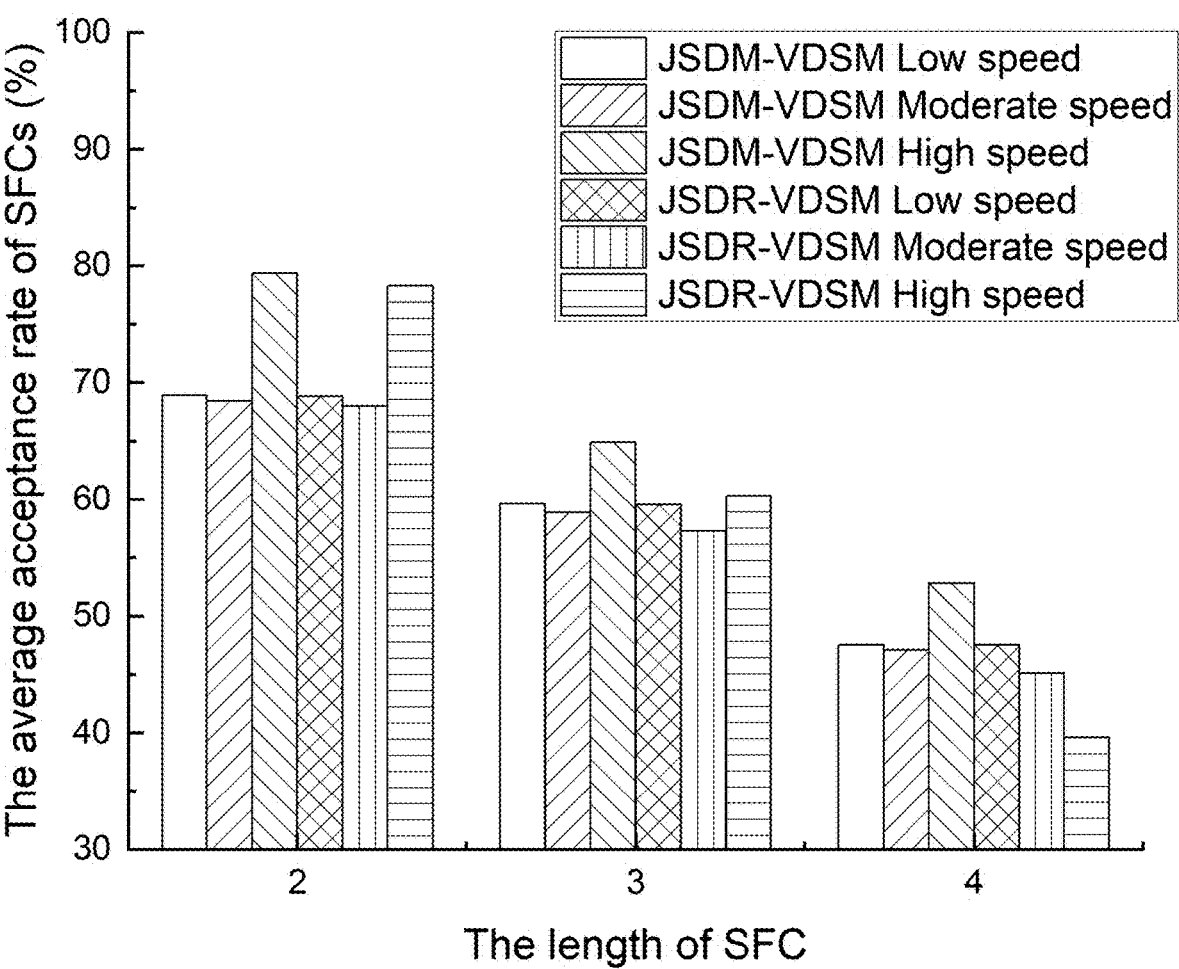
FIG. 7A and FIG. 7B are schematic performance evaluation comparison diagrams of algorithms under varying user movement speeds and different service function chain lengths according to an embodiment of the present disclosure, where
Figure 7B:
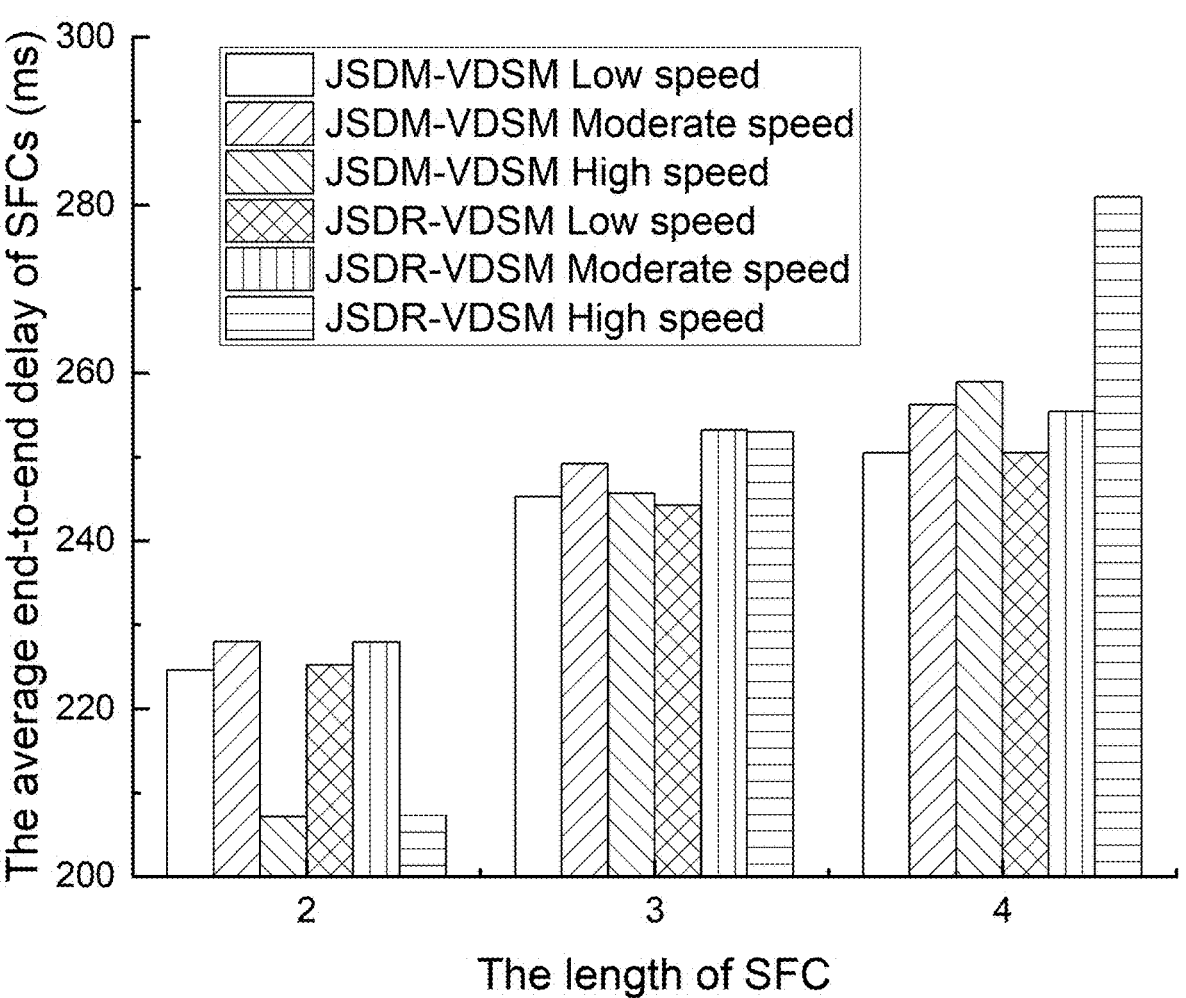

Different services require different VNF functions, and thus the length of an SFC may vary depending on the service demand. For example, some services may require more complex VNFs, while other services may only require simple VNFs. An effective algorithm should be capable of adapting to various services and ensure flexibility in VNF placement and SFC configuration, to satisfy specific demands of various services. FIG. 7A and FIG. 7B illustrate the performance evaluation of JSDM-VDSM and JSDR-VDSM algorithms at different user movement speeds and different SFC lengths. In this evaluation, the migration condition di is fixed at 2, while the number of SFCs remains 240.

FIG. 7A demonstrates that as the SFC length increases, the acceptance rate of both algorithms decreases. This is because longer SFCs consume more resources, thereby reducing the number of SFCs that can be accepted. In addition, it can be observed that, for different SFC lengths, JSDM-VDSMA achieves a higher acceptance rate at higher movement speeds. This is because higher speeds increase the probability of satisfying the migration condition (dis=2), thereby allowing the occupied resources to be released through migration. These released resources can be used to deploy newly arrived SFC requests. For JSDR-VDSMA, when the SFC length is 2 or 3, the acceptance rate is relatively high at relatively high speeds. However, when the SFC length is increased to 4, the acceptance rate drops under high speed conditions. This is because even if the migration condition (dis=2) is satisfied, JSDR-VDSMA only switches the access points, but does not migrate the VNFs. Longer SFCs occupy more resources, resulting in a decrease in the number of accepted SFCs. Overall, JSDM-VDSMA consistently outperforms JSDR-VDSMA in terms of acceptance rate.

FIG. 7B demonstrates that as the SFC length increases, the end-to-end delay for both algorithms also increases. This is because longer SFCs result in more VNF processing delay and link delay. When the SFC length is 2, the two algorithms perform similarly in terms of delay. In the case that the SFC length is 3 or 4, JSDM-VDSMA significantly outperforms JSDR-VDSMA in reducing delay under high speed conditions. This is because the migration condition (dis=2) can be more easily satisfied under higher speeds, and the migration-based method of JSDM-VDSMA is more effective in reducing delay than the rerouting-based method of JSDR-VDSMA.

In summary, in the experimental results, compared to the rerouting-based algorithm, the method of the present disclosure consistently achieves superior performance in terms of average service function chain acceptance rate, average end-to-end delay, and average resource utilization cost, particularly under high-speed user mobility scenarios.

What is claimed is:

1. A method for service function chain (SFC) deployment and migration based on virtualized network function (VNF)-dependent components, wherein the method is based on a mobile terminal user initiating service request information to a software-defined networking (SDN) controller, the SDN controller analyzes, based on the service request information, user demand types and resource requirements thereof, comprising bandwidth resources, computing resources, storage resources, and delay requirements, and the SDN controller, in combination with a network topology structure, resource status of an edge server, and network operation conditions, optimizes the SFC deployment and migration using deep reinforcement learning technology, the method comprises the following steps:

(1) constructing a communication architecture comprising a mobile user, the edge server, and the SDN controller, wherein in the communication architecture, the mobile user is configured to dynamically generate a service demand, comprising a computing task, a data storage service, and a communication service, the edge server is deployed at locations close to the mobile user and configured to provide computing and communication services for the mobile user, and the SDN controller is configured to monitor in real time the service demand of the mobile user and the resource status of the edge server, and dynamically adjust resource allocation and scheduling policies based on network topology information;

(2) constructing a user request model, a communication model, and a computing model for describing operation mechanisms and performance metrics of a communication system, wherein the user request model comprises a deployment request and a migration request of SFCs, the deployment request describes the user demands for bandwidth resources, computing resources, memory resources, and storage resources, and the migration request is used for transferring currently deployed SFCs to a target edge server when the mobile user moves;

the communication model defines a bandwidth allocation policy of the edge server, and computes transmission rate and data transmission time based on Shannon Formula and channel interference metrics, thereby achieving appropriate allocation of communication resources;

the computing model comprises processing and computing end-to-end communication delay, resource usage cost, and interruption delay during SFC migration for use in evaluating service performance and providing theoretical support for resource optimization and scheduling in the communication system;

(3) formulating a resource scheduling optimization problem and defining an optimization objective based on the network topology information, the user request model, the communication model, and the computing model of the communication system, wherein the optimization problem comprises maximizing service access rate of user requests, minimizing end-to-end communication delay and SFC migration cost, and maximizing resource utilization rate; during an SFC migration process, VNF migration paths and resource usage costs of dependent components are optimized to reduce service interruption time caused by the migration; and (4) performing deep reinforcement learning-based SFC deployment and migration with consideration of VNF-dependent components, wherein the SDN controller collects in real time the user requests, the resource status of the edge server, and the network topology information, and a deep reinforcement learning algorithm is used to dynamically make decisions on the following content:

a user access policy: intelligently selecting an optimal edge server for access based on a geographic location and a service demand of the mobile user;

an SFC deployment and migration policy: dynamically adjusting deployment and migration paths of the SFCs by comprehensively considering the resource utilization rate, the end-to-end communication delay, and migration delay; and a VNF-dependent component migration policy: prioritizing migration of key VNF components based on dependency relationships of VNFs in the SFCs to ensure integrity and continuity of a service chain.

2. The method for SFC deployment and migration based on VNF-dependent components according to claim 1, wherein the user request model, the communication model, and the computing model according to Step (2) are as follows:

(21) the user request model, wherein the user request r is denoted as $$SFCr, \Gamma_r = (b_r, \bar{d}r, TTL_r, G_r, \tau_r^s)$$

is a 5-tuple of SFCr, where $b_r$ is defined as a bandwidth requirement, $\bar{d}r$ denotes a communication delay requirement, and $TTL_r$ denotes a lifetime of SFCr; the SFCr is described as a directed graph $G_r=(F_r, E_r)$, where $F_r=\{f_{r1}, f_{r2}, \ldots, f_{rh}, f_{r|F_r|}\}$ denotes a set of VNFs in the SFCr, any one VNF $f_{rh}$ requires a CPU resource $$R_{f_{rh}}^c$$

and a memory resource $$R_{f_{rh}}^m,$$

and $E_r$ denotes a virtual link of the SFCr; an arrival time of the SFCr is denoted as $$\tau_r^s = m \cdot \triangle,$$

where m denotes the number of time slots, and $\triangle$ denotes duration of each time slot;

for SFC deployment, a decision variable $$a_r^{n_i}(t)$$

is used to indicate whether to access a network through an edge server node $$n_i, x_{f_{rh}}^{n_i}(t)$$

is used to indicate whether to place the VNF $f_{rh}$ on the edge server node $n_i$, and $$y_{\xi_{f_{rg}, f_{rh}}}^{e_{ij}}(t)$$

is a binary variable used to indicate whether a logical link $\xi_{f_{rg}, f_{rh}}$ is mapped to a link $e_{ij}$, mathematically expressed as:

$$a_r^{n_i}(t) = \begin{cases} 1, & \text{if } r \text{ accesses network via } n_i, \\ 0, & \text{otherwise} \end{cases}$$

$$x_{f_{rh}}^{n_i}(t) = \begin{cases} 1, & \text{if } f_{rh} \text{ is placed on } n_i, \\ 0, & \text{otherwise} \end{cases}$$

$$y_{\xi_{f_{rg}, f_{rh}}}^{e_{ij}}(t) = \begin{cases} 1, & \text{if } \xi_{f_{rg}, f_{rh}} \text{ is mapped on } e_{ij} \\ 0, & \text{otherwise} \end{cases}$$

for SFC migration, when one of the VNFs is deployed on the edge server node $n_i$ or migrated to the edge server node $n_j$, if component resources required for supporting operation of one of the VNFs are unavailable at $n_i$, the VNF-dependent components must be migrated from other nodes to the edge server node $n_i$ to ensure normal operation of the one of VNFs;

(22) the communication model, wherein the bandwidth resources of the edge server node $n_i$ are uniformly allocated to SFC^r to ensure fair allocation, mathematically expressed as:

$$w_{n_i}^r = \phi_{n_i}^b \cdot \frac{a_r^{n_i}}{\displaystyle\sum_{r_j \in N_{n_i}} a_{r_j}^{n_i}},$$

where $N_{n_i}$ denotes a set of SFCs accessing the edge server node $$n_i, \phi_{n_i}^b$$

denotes the bandwidth resources on the edge server node $n_i$, and $$a_{r_j}^{n_i}$$

represents whether $SFCr_j$ accesses the network via the edge server node $n_i$, with a value of 1 indicating access to the network via the edge server node $n_i$, and 0 otherwise; a parameter $$\gamma_{n_i}^r$$

is used to represent channel interference experienced by SFCr when accessing the edge server node $n_i$, the channel interference is generated due to channel contention caused by other SFCs simultaneously accessing the same node, $P_{r_j}$ denotes a transmission capability of the $SFCr_j$, and $$H_{n_i}^{r_j}$$

denotes a channel gain influenced by a distance between the $SFCr_j$ and the edge server node $n_i$ and a power gain caused by a small-scale fading effect in a channel, mathematically expressed as:

$$\gamma_{n_i}^r = \sum_{r_j \in N_{n_i} \backslash \{r\}} p_{r_j} \cdot H_{n_i}^{r_j};$$

on this basis, a transmission rate between the SFCr and the edge server node $n_i$ is obtained by using the following formula:

$$\text{rate}_{n_i}^r = w_{n_i}^r \cdot \log_2\left(1 + \frac{p_r \cdot H_{n_i}^r}{\gamma_{n_i}^r + \rho^2}\right),$$

where $\rho^2$ denotes a signal-to-noise ratio, and data transmission delay $$d_r^{trans}$$

refers to time required for transmitting to-be-transmitted data of the SFCr to the edge server node $n_i$, expressed as:

$$d_r^{trans} = \frac{ds_r}{\text{rate}_{n_i}^r}.$$

(23) the computing model,
wherein the end-to-end communication delay $D_r$ of SFCr is defined as a sum of data transmission delay, VNF processing delay, and link propagation delay, as shown below:

$$D_r = d_r^{trans} + \sum_{f_{rh} \in F_r} x_{f_{rh}}^{n_i} \cdot d_{n_i} + \sum_{\xi_{f_{rg}, f_{rh}} \in E_r} y_{\xi_{f_{rg}, f_{rh}}}^{e_{ij}} \cdot d_{e_{ij}};$$

deployment costs of the SFCs are defined as follows:

$$C_r^d = \sum_{f_{rh} \in M_r} \sum_{\psi_q \in \Psi_{f_{rh}}^{mig}} \sum_{p_{ij} \in L_{\psi_q}} y_{p_{ij}}^{e_{ij}} + \sum_{f_{rh} \in M_r} \sum_{\psi_q \in \Psi_{f_{rh}}^{mig}} x_{f_{rh}}^{n_i} \cdot c_{n_i}^{sto} \cdot R_{\psi_q}^s$$

where $L_{\psi_q}$ is a path used by a migration component $$\psi_q, y_{p_{ij}}^{e_{ij}}$$

is a binary variable indicating whether $p_{e_{ij}}$ on the path L p is mapped to a link $e_{ij}$, and $$c_{n_i}^{sto}$$

denotes unit storage costs of the edge server node $n_i$, wherein $M_r$ denotes a set of the VNFs that require migration in SFCr.

3. The method for SFC deployment and migration based on VNF-dependent components according to claim 2, wherein the method minimizes interruption time and enhances success rates through pre-copy migration, the interruption time is defined as duration of a final phase in a migration process, during which services are temporarily interrupted to complete final data synchronization, $$d_{f_{rh}}^{mig,s}$$

is used to denote start time of an interruption period, $$d_{f_{rh}}^{mig,e}$$

denotes end time of the interruption period, and expressions of the two are as follows:

$$d_{f_{rh}}^{mig,s} = \sum_{q=1}^{\theta_{f_{rh}}} d_{f_{rh}}^q = \frac{M_{f_{rh}}^m}{b_{f_{rh}}} \cdot \frac{1 - \left(\dfrac{dir_{f_{rh}} \cdot M_{f_{rh}}^m}{b_{f_{rh}}}\right)^{\theta_{f_h}}}{1 - \dfrac{dir_{f_{rh}} \cdot M_{f_{rh}}^m}{b_{f_{rh}}}},$$

-continued $$d_{f_{rh}}^{mig,e} = \sum_{q=1}^{\theta_{f_{rh}}+1} d_{f_{rh}}^q = \frac{M_{f_{rh}}^m}{b_{f_{rh}}} \cdot \frac{1 - \left(\frac{dir_{f_{rh}} \cdot M_{f_{rh}}^m}{b_{f_{rh}}}\right)^{\theta_{f_{rh}}+1}}{1 - \frac{dir_{f_{rh}} \cdot M_{f_{rh}}^m}{b_{f_{rh}}}},$$

where $$d_{f_{rh}}^q$$

denotes migration time of a q-th iteration, $\theta_{f_{rh}}$ denotes actual number of iterations, $$M_{f_{rh}}^m$$

denotes a memory page size of $VNF_{f_{rh}}$ to be migrated, $b_{f_{rh}}$ denotes a migration rate of VNF $f_{rh}$, and therefore, the interruption time is defined as follows:

$$d_r^{inter} = \max\left\{d_{f_{rh}}^{mig,e}\right\} - \min\left\{d_{f_{rh}}^{mig,s}\right\}, f_{rh} \in M_r.$$

4. The method for SFC deployment and migration based on VNF-dependent components according to claim 1, wherein the optimization problem and the optimization objective according to Step (3) are as follows:

Constraint 1: each of the VNF $f_{rh}$ is only fully deployed on at most one server node, and VNF instances are indivisible, expressed as:

$$\sum_{n_i \in N} x_{f_{rh}}^{n_i} \leq 1, \forall r \in \Gamma_d \cup \Gamma_m, \forall f_{rh} \in F_r;$$

Constraint 2: communication quality among users connected to the network through a same node is mutually affected, and each physical node can accommodate at most $n_{max}$ users to maintain service quality for all users, mathematically expressed as:

$$\sum_{r \in \Gamma_d \cup \Gamma_m} a_r^{n_i} \leq n_{max}, \forall n_i \in N;$$

Constraint 3: on any one of the edge server node $n_i$, total CPU and memory resource requirements for the SFC deployment and migration do not exceed a maximum CPU and memory resource capacity, mathematically expressed as:

$$\sum_{r \in \Gamma_d \cup \Gamma_m} \sum_{f_{rh} \in F_r} x_{f_{rh}}^{n_i} \cdot R_{f_{rh}}^c \leq \phi_{n_i}^c, \forall n_i \in N,$$

$$\sum_{r \in \Gamma_d \cup \Gamma_m} \sum_{f_{rh} \in F_r} x_{f_{rh}}^{n_i} \cdot R_{f_{rh}}^m \leq \phi_{n_i}^m, \forall n_j \in N;$$

Constraint 4: used storage resources do not exceed a maximum storage resource capacity, mathematically expressed as:

$$\sum_{\psi_q \in \Psi_{n_i}} z_{\psi_q}^{n_i} \cdot R_{\psi_q}^s \leq \phi_{n_i}^s, \forall n_i \in N,$$

where $\Psi_{n_i}$ denotes a set of components on node $n_i$;

Constraint 5: total bandwidth consumption on any link $e_{ij}$ is less than a maximum bandwidth capacity, a condition being expressed as follows:

$$\sum_{r \in \Gamma_d \cup \Gamma_m} \sum_{\xi_{f_{rg}}, f_{rh} \in E_r} y_{\xi_{f_{rg}}, f_{rh}}^{e_{ij}} \cdot b_r \sum_{r \in \Gamma_m} \sum_{f_{rh} \in M_r} \sum_{p_{ij} \in L_{f_{rh}}} y_{p_{ij}}^{e_{ij}} \cdot b_{f_{rh}} \leq b_{e_{ij}},$$

$$\forall e_{ij} \in E,$$

where the first term represents a link bandwidth occupied by SFC deployment, and the second term represents a bandwidth used for the SFC migration;

Constraint 6: end-to-end delay of any SFCr must satisfy the following constraint:

$$D_r \leq \bar{d}_r, \forall r \in \Gamma_d \cup \Gamma_m \quad (20)$$

wherein a JSDM-VDSM problem is defined based on the aforementioned constraints, the JSDM-VDSM problem comprises an SFC deployment policy, an SFC migration policy, and a VNF-dependent component migration policy Z, and an objective of the method is to maximize QoS by improving service acceptance rate, reducing resource usage cost, and minimizing communication delay and interruption delay, the optimization objective being mathematically defined as follows:

$$\max_{X,Y,A,Z} \frac{1}{T} \qquad\qquad\qquad P1$$

$$\sum_{t=1}^{T} \sum_{r \in \Gamma_d \cup \Gamma_m} Z_r(t) \cdot \left[w_1 \cdot b_r - w_2 \cdot C_r^d(t) - w_3 \cdot D_r(t) - w_4 \cdot d_r^{inter}(t)\right],$$

where $Z_r(t)$ is a decision variable used to determine whether the SFCr is accepted, and if the SFCr is accepted, $Z_r(t)$ is set to 1 and otherwise set to 0, and $w_1$, $w_2$, $w_3$, and $w_4$ denote weights of different metrics.

5. The method for SFC deployment and migration based on VNF-dependent components according to claim 1, wherein Step (4) further comprises:

identifying, within a network architecture, the SFCs that require orchestration, comprising SFCs requiring deployment and SFCs scheduled for migration, and treating the SFC migration as joint optimization of VNF redeployment and SFC rerouting;

acquiring status of an environment and current SFCs to be orchestrated, wherein the status comprises available CPU, memory, storage, bandwidth, and component resources of physical nodes; CPU, memory, and component resource requirements of VNFs to be deployed; the number of VNFs not yet placed in deployed SFCs; the partial communication delay of the current SFCs, and the lifetime of the SFCs;

inputting an acquired status $s_i$ into a network $Actor_{old}$ to obtain a VNF deployment decision $a_i$, and then performing iterative interaction with the environment to collect a set of experimental data $[s_i, a_i, r_i, s_{i+1}]$ and storing the same in a memory;

computing an advantage function $A_{\theta_{old}}$ based on the experimental data for use in updating a Critic network;

updating a Actor network using a clipped objective function $J_{\theta_{old}}(\theta)$, wherein after multiple iterations, parameters of the Actor network are transferred to the network Actor$_{old}$, and the iteration process continues until convergence is achieved, wherein a process of solving the JSDM-VDSM problem comprises obtaining the SFC r, determining a user access node A, and SFC deployment or migration policies X and Y; obtaining a VNF-dependent component migration policy Z based on the policies X and Y; prior to learning service provisioning policies, the SDN controller collects global information and releases an SFC whose lifetime has expired, and then identifies the SFCs that require deployment or migration;

requested SFCs for deployment are SFC requests that randomly arrive within a current time slot t, and requested SFCs for migration are SFC requests that meet a migration criterion within the same time slot; if no requests require processing, the SDN controller proceeds to a next time slot to continue to acquire requests until $r_{batch}$ is non-empty; subsequently, the SFC requests in $r_{batch}$ are deployed or migrated sequentially;

for the deployment and migration requests, user regions related to the SFC requests are first determined, and then the SDN controller evaluates whether a base station in the current region has sufficient capacity; if the base station has sufficient capacity, access is performed through the base station; if the base station does not have sufficient capacity, the SDN controller plans connection via adjacent regions, firstly identifying adjacent regions, then computing access capacities of these regions; subsequently, accessible nodes max_num_node with maximum access capacity are determined, and a region capable of accommodating the maximum capacity is selected; further, one access node is selected from the accessible nodes max_num_node with probability $1-\in$, and one access node is selected from a set of the accessible nodes n_max_num_node with probability $\in$;

after an access point is selected, the deployment or migration policies of the SFCs and the VNF-dependent component migration policy are determined; a first VNF of SFCr is identified first, then current status is acquired, and a placement position of a VNF $f_{rh}$ is determined based on a policy $\pi_{\theta old}(a_i, s_i)$; if the VNF $f_{rh}$ can be placed on a node $a_i$, but components required for operation of the VNF $f_{rh}$ are not currently available on the node $a_i$, required dependent components of the VNF $f_{rh}$ is migrated to the node $a_i$, then a next VNF is placed, and updated status $s_{i+1}$ is recorded;

an aforementioned process continues until the SFCs are successfully deployed or migrated; a reward is computed based on a deployment result; if the deployment result is successful, a reward for successful deployment is computed; if a deployment or migration of the SFCs fails, the communication system is restored to last successfully reached status $s_{i-u+1}$.

\* \* \* \* \*